US007958634B2

(12) United States Patent
Kobayashi et al.

(10) Patent No.: US 7,958,634 B2
(45) Date of Patent: Jun. 14, 2011

(54) LIQUID EJECTING HEAD MANUFACTURING METHOD

(75) Inventors: Hiroyuki Kobayashi, Shiojiri (JP); Hiroshige Owaki, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 119 days.

(21) Appl. No.: 12/561,932

(22) Filed: Sep. 17, 2009

(65) Prior Publication Data

US 2010/0071211 A1 Mar. 25, 2010

(30) Foreign Application Priority Data

Sep. 22, 2008 (JP) ................................ 2008-242137
Sep. 22, 2008 (JP) ................................ 2008-242138
Jul. 16, 2009 (JP) ................................ 2009-167536

(51) Int. Cl.
*B21D 53/76* (2006.01)
*B23P 17/00* (2006.01)
*B41J 2/15* (2006.01)
*B41J 2/145* (2006.01)
*B29C 45/14* (2006.01)

(52) U.S. Cl. .......... 29/890.1; 347/40; 264/275; 264/263

(58) Field of Classification Search ................. 29/890.1, 29/25.35; 347/20, 40, 44–45; 310/311, 316.01, 310/317; 264/271.1–279.1, 328.1–331.22, 264/263, 273, 274, 275, 279
See application file for complete search history.

(56) References Cited

U.S. PATENT DOCUMENTS 5,464,578 A * 11/1995 Salter et al. ................... 264/250
5,688,460 A * 11/1997 Ruschke ....................... 264/263
5,938,991 A * 8/1999 Pollock .......................... 264/28
6,033,610 A * 3/2000 Swanson et al. .............. 264/250
6,415,121 B1 * 7/2002 Suzuki et al. ................. 399/111
6,958,183 B2 * 10/2005 Okamura et al. .......... 428/195.1
7,029,617 B2 * 4/2006 Nishimuro et al. ........... 264/267
7,153,459 B2 * 12/2006 Kitahara ....................... 264/238
7,862,759 B2 * 1/2011 Kamikura ..................... 264/263
2004/0183229 A1 * 9/2004 Kunzel et al. ................. 264/279
2009/0122125 A1 * 5/2009 Owaki et al. .................... 347/93
2009/0212460 A1 8/2009 Kamikura
2009/0225142 A1 * 9/2009 Kamikura ....................... 347/92
2010/0071211 A1 * 3/2010 Kobayashi et al. .......... 29/890.1

FOREIGN PATENT DOCUMENTS

JP 02-038377 2/1990

(Continued)

OTHER PUBLICATIONS

U.S. Appl. No. 12/389,507, filed Jun. 2, 2010, Office Action.

*Primary Examiner* — A. Dexter Tugbang
*Assistant Examiner* — David P Angwin
(74) *Attorney, Agent, or Firm* — Workman Nydegger

(57) ABSTRACT

A method of manufacturing a liquid ejecting head that ejects a liquid supplied from a liquid storing member through a liquid supply path. The method includes positioning a filter to a first or second supply member by using positioning pins upon disposing the filter between first and second liquid supply paths. The first supply member has the first liquid supply path. The second supply member has the second liquid supply path on the side of one surface of the first supply member to communicate with the first liquid supply path. At least the first supply member and the second supply member are integrated such that a fixed portion is molded by injecting a resin material from an injection portion of a mold at a position where the first and second liquid supply paths are interposed between the positioning pins.

9 Claims, 17 Drawing Sheets

FOREIGN PATENT DOCUMENTS

| | | | |
|---|---|---|---|
| JP | 2000-211130 | * | 8/2000 |
| JP | 2001-030297 | | 2/2001 |
| JP | 2002-067312 | | 3/2002 |
| JP | 2007-069434 | | 3/2007 |
| JP | 2007-160821 | | 6/2007 |
| JP | 2007-160863 | | 6/2007 |

* cited by examiner

LIQUID EJECTING HEAD MANUFACTURING METHOD

BACKGROUND

1. Technical Field

The present invention relates to a liquid ejecting head manufacturing method, which is particularly suitable for manufacturing an ink jet printing head mounted on an ink jet printing apparatus.

2. Related Art

In an ink jet printing head which is a representative example of a liquid ejecting head, generally, ink is supplied from an ink cartridge as a liquid storing member having ink filled therein to a head body through an ink supply needle as an ink supply body separably inserted into the ink cartridge and an ink passageway formed in a supply member such as a cartridge casing holding the ink cartridge, and the ink supplied to the head body is ejected from a nozzle by driving a pressure generating member such as a piezoelectric element formed in the head body.

In such an ink jet printing head, when bubbles existing inside the ink of the ink cartridge or bubbles mixed in the ink during an ink cartridge attaching or detaching operation are supplied to the head body, a problem arises in that an ejecting error such as a dot omission is caused by the bubbles. In order to solve such a problem, for example, JP-A-2000-211130 discloses a technology in which a filter is formed between the supply member and the ink supply needle inserted into the ink cartridge so as to remove particles or bubbles existing inside the ink.

In addition, the filter and the supply member are fixed to each other by melt-fixing, and the ink supply needle and the supply member are fixed to each other by ultrasonic melt-fixing.

However, in the configuration disclosed in JP-A-2000-211130, since the filter is formed in an area where the ink supply needle is fixed to the supply member, it is necessary to provide an area according to an area of the filter, and to provide an area where the ink supply needle and the filter are individually melt-fixed to the supply member. For this reason, a gap between the adjacent ink supply needles cannot be formed to be short, which causes such a problem that the liquid ejecting head increases in size.

Further, in the configuration disclosed in JP-A-2000-211130, when the area of the filter is excessively decreased in order to realize a decrease in size of the liquid ejecting head, the dynamic pressure increases. As a result, a problem arises in that a driving voltage for driving a pressure generating member such as a piezoelectric element or a heating element has to be increased.

Furthermore, since the positional deviation of the filter may occur upon fixing the filter to the supply member by melt-fixing or the like, the smooth ink flow in the filter may be deteriorated in accordance with a degree of the positional deviation.

Moreover, such a problem occurs in a liquid ejecting head for ejecting a liquid except for ink as well as the ink jet printing head.

SUMMARY

An advantage of some aspects of the invention is that it provides a liquid ejecting head manufacturing method capable of satisfactorily performing an operation of positioning a filter to a predetermined position and of realizing a decrease in size of a liquid ejecting head.

In order to achieve the above-described object, according to an aspect of the invention, there is provided a method of manufacturing a liquid ejecting head provided with a nozzle opening used to eject a liquid supplied from a liquid storing member storing the liquid therein through a liquid supply path, the method including: positioning a filter to a first supply member or a second supply member by using positioning pins upon disposing the filter between first and second liquid supply paths, where the first supply member has the first liquid supply path which is a part of the liquid supply path and the second supply member has the second liquid supply path which is disposed on the side of one surface of the first supply member so as to communicate with the first liquid supply path and is the other part of the liquid supply path; and integrating at least the first supply member and the second supply member in such a manner that a fixed portion is molded by injecting a resin material from an injection portion of a mold disposed at a position where the first and second liquid supply paths are interposed between the positioning pins.

According to this aspect, since the filter, the first supply member, and the second supply member are integrated with each other by the fixed portion molded by the resin material injected from the injection portion of the mold, it is not necessary to provide an area used to individually melt-fix the second supply member and the filter to the first supply member. Accordingly, it is possible to decrease a gap between the adjacent second supply members by increasing the effective area of the filter, and thus to realize a decrease in size of the liquid ejecting head. In addition, since it is not necessary to decrease an area of the filter so as to realize a decrease in size of the liquid ejecting head, it is possible to prevent the dynamic pressure from increasing. As a result, it is not necessary to increase a driving voltage for a pressure generating member such as a piezoelectric element or a heating element.

In addition, since the filter is regulated to a predetermined position by using the positioning pin, the filter is satisfactorily positioned to a predetermined position. As a result, the liquid reliably passes through the filter. In addition, since the injection port used for injecting the resin material is formed at a position where the liquid supply path is interposed between the positioning pins, it is possible to satisfactorily perform the molding operation without deteriorating the fluidity of the resin material.

Here, the positioning may be performed by inserting the positioning pins into positioning holes of the filter, and the integrating may be performed in such a manner that the resin material is injected from the injection portion of the mold and the fixed portion is molded by melting the positioning pins using the injected resin material. Accordingly, it is possible to regulate the position of the filter so as to be located at a predetermined position by using the positioning holes, and thus to satisfactorily position the filter to a predetermined position. As a result, the liquid reliably passes through the filter. In addition, since the resin material is filled while melting the positioning pins, the fluidity of the resin material in the mold is not deteriorated by the positioning pins. Accordingly, it is possible to satisfactorily mold the fixed portion.

In addition, each positioning pin may be formed by a member having a melting point lower than that of the first supply member and the second supply member, and may be mounted to the first supply member or the second supply member. Accordingly, it is possible to easily melt only the positioning pin during the resin material filling operation. Further, the positioning pins may be disposed in the first supply member or the second supply member. In this case, it is possible to appropriately perform the positioning operation by inserting the positioning pins disposed in the first supply member or the second supply member into the positioning holes formed in the filter.

In the positioning, the positioned filter may be fixed to the first supply member. Accordingly, it is possible to further reliably perform the operation of positioning the filter to the first supply member. In this case, as the fixing method, the melt-fixing method may be appropriately used.

Further, the integrating may be performed in such a manner that the fixed portion is molded by injecting the resin material to the one surface of the first supply member so as to cover a part of the second supply member. In this case, since it is possible to ensure a large molding resin passageway between one surface of the first supply member and the inner periphery of the mold, it is possible to satisfactorily mold the fixed portion by ensuring the satisfactory fluidity of the resin material.

In the integrating, the resin material may be made to flow from the one surface of the first supply member into a concave portion which is formed in the first supply member and of which a part of opening is blocked by the second supply member. In this case, the resin material flowing into the concave portion exhibits an anchor effect between the second supply members, and hence the filter, the first supply member, and the second supply member are further reliably integrated with each other by the fixed portion.

In the integrating, the fixed portion may be molded in the outer peripheries of the first supply member and the second supply member by the injected resin material so that the fixed portion has a portion from the first supply member to the second supply member. In this case, the first and second supply members are reliably fixed by the fixed portion, and hence the filter is reliably fixed between the first and second supply members.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, the embodiments of the invention will be described with reference to the accompanying drawings.

First Embodiment

Figure 1:
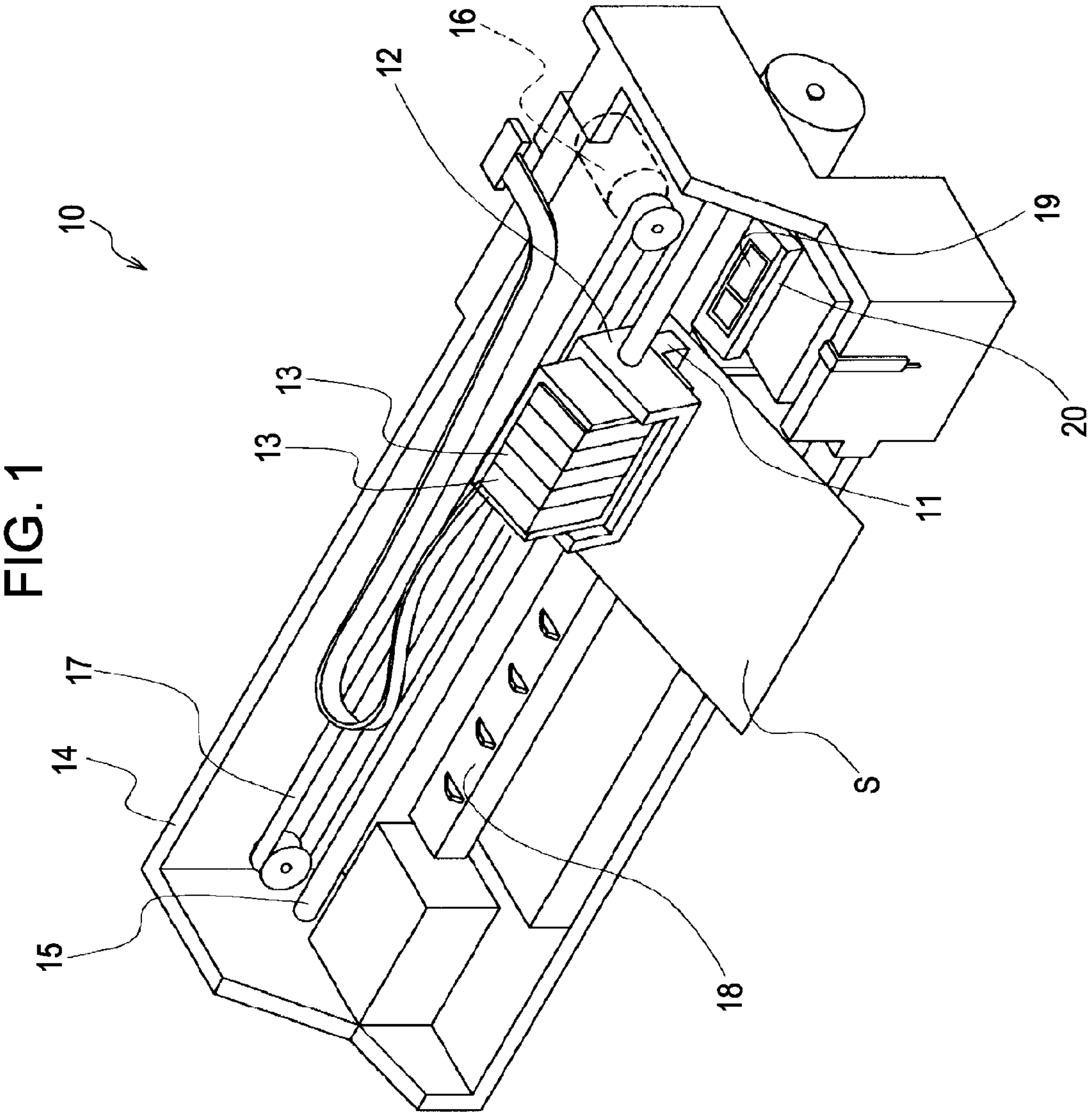
FIG. 1 is a schematic perspective view showing a printing apparatus according to the embodiment of the invention.

FIG. 1 is a schematic perspective view showing an ink jet printing apparatus which is an example of a liquid ejecting apparatus mounted with a liquid ejecting head obtained by a liquid ejecting head manufacturing method according to the first embodiment of the invention. As shown in FIG. 1, in an ink jet printing apparatus 10, an ink jet printing head (hereinafter, referred to as a printing head) 11 which is an example of a liquid ejecting head for ejecting ink droplets is fixed to a carriage 12, and ink cartridges 13 which are liquid storing members separably fixed to the printing head 11, where the liquid storing members store therein plural different colors such as black (B), light black (LB), cyan (C), magenta (M), and yellow (Y).

The carriage 12 mounted with the printing head 11 is formed in a carriage shaft 15 mounted on an apparatus body 14 so as to be movable in the axial direction. In addition, when driving force of a driving motor 16 is transmitted to the carriage 12 through plural gears (not shown) and a timing belt 17, the carriage 12 moves along the carriage shaft 15. Meanwhile, the apparatus body 14 is provided with a platen 18 which is formed along the carriage shaft 15, and a printing medium S such as a paper sheet fed by a paper sheet feeding device (not shown) or the like is transported on the platen 18.

A capping device 20 including a cap member 19 for sealing a nozzle formation surface of the printing head 11 is formed at a position corresponding to a home position of the carriage 12, that is, the vicinity of one end of the carriage shaft 15. By sealing the nozzle formation surface provided with nozzle openings using the cap member 19, it is possible to prevent ink from drying up. In addition, the cap member 19 also serves as an ink receiving member during a flushing operation.

Figure 2:
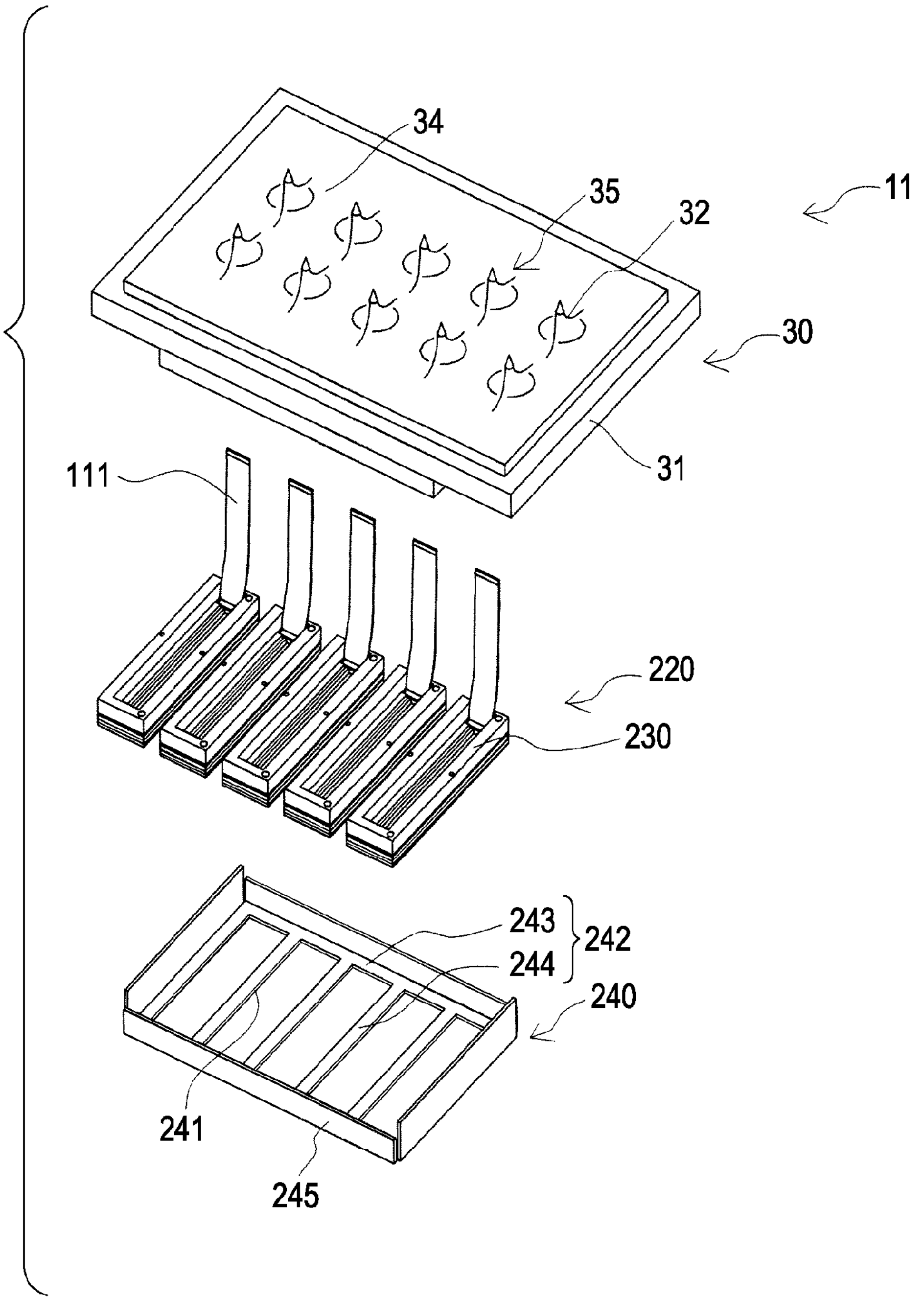
FIG. 2 is an exploded perspective view showing a printing head according to the embodiment of the invention.

Here, the printing head 11 will be described in more detail. FIG. 2 is an exploded perspective view showing the ink jet printing head which is an example of the liquid ejecting head. As shown in FIG. 2, the printing head 11 includes a supply member 30 such as a cartridge casing to which the ink cartridges 13 as the liquid storing members are fixed; head bodies 220 which are fixed to the surface opposite to the surface where the ink cartridges 13 are fixed to the supply member 30; and a cover head 240 which is formed on the side of the liquid ejecting surfaces of the head bodies 220.

Among the constituents, the supply member 30 will be described in detail with reference to FIGS. 3 and 4. Here, FIG. 3 is a plan view showing the supply member, and FIG. 4 is an enlarged sectional view taken along the line IV-IV in FIG. 3.

Figure 3:
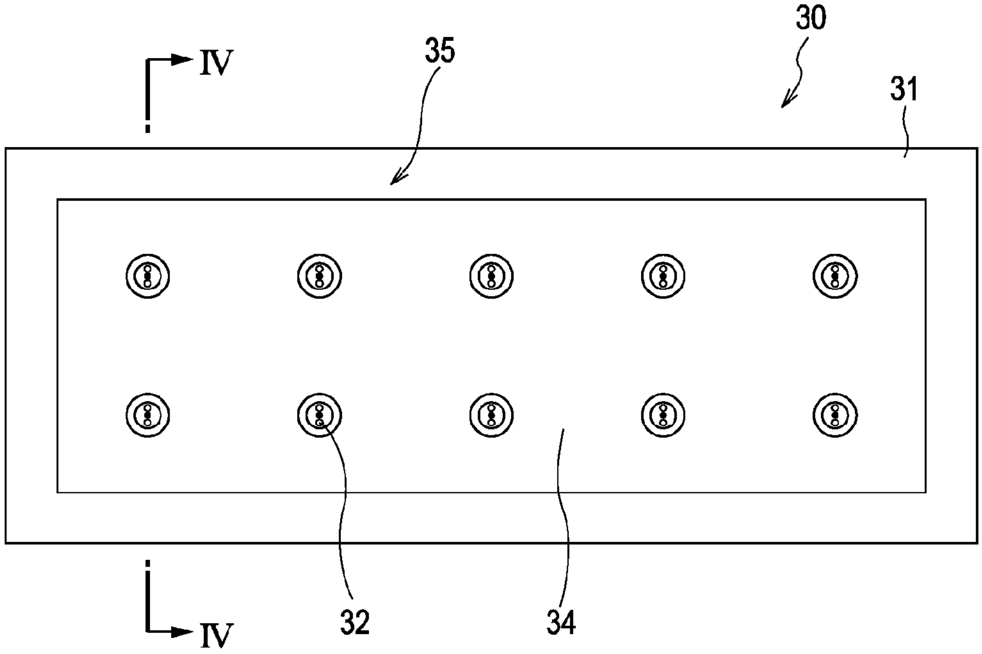
FIG. 3 is a plan view showing a supply member according to the first embodiment of the invention.
Figure 4:
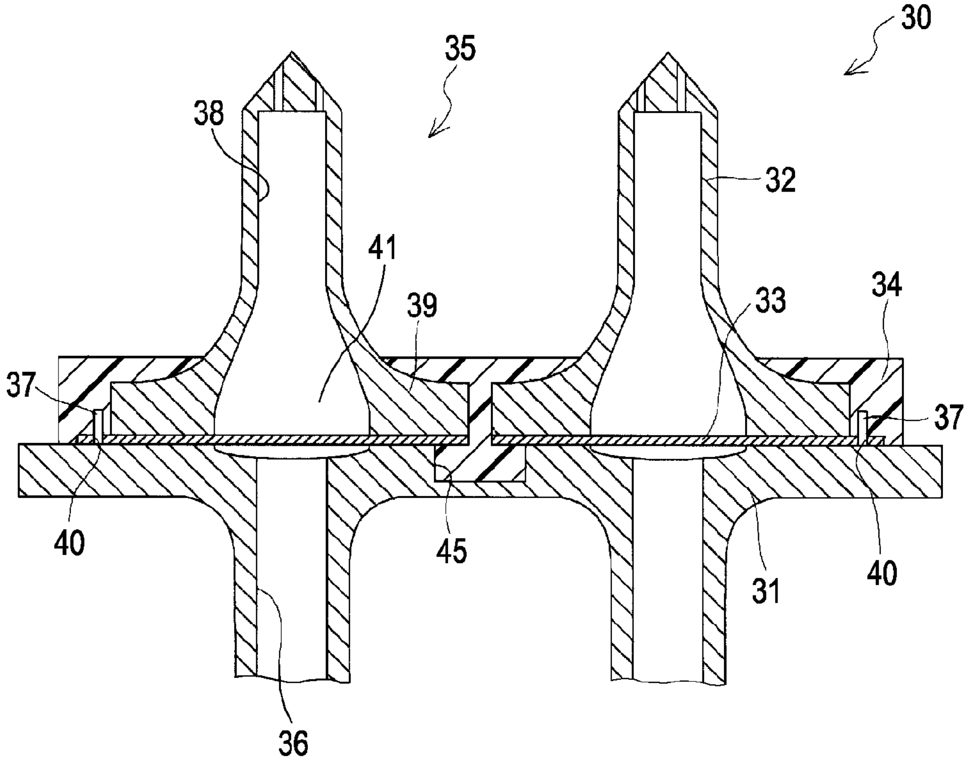
FIG. 4 is an enlarged sectional view taken along the line IV-IV in FIG. 3.

As shown in FIGS. 3 and 4, the supply member 30 includes a supply member body 31 which is a first supply member; supply needles 32 which are second supply members formed on one surface of the supply member body 31; a filter 33 which is formed between the supply member body 31 and each supply needle 32; and a fixed portion 34 which is formed on one surface of the supply member body 31 so that the filters 33, the supply member body 31, and the supply needles 32 are integrated with each other.

The supply member 30 includes a supply body forming portion 35 formed on one surface thereof so as to mount the above-described ink cartridges 13 thereon. The supply body forming portion 35 may not be a type in which the ink cartridges 13 are mounted, but may be a type in which ink is introduced from the liquid storing members into the supply body forming portion 35 through a tube.

The supply member body 31 is provided with liquid supply paths 36 as first liquid supply paths each of which is formed on the downstream side of each filter 33 to be described later so that one end thereof is opened to the supply body forming portion 35 and the other end thereof is opened to each head body 220, where the first liquid supply paths are used to supply the ink from the ink cartridge 13 to the head body 220. Here, a plurality of the liquid supply paths 36 are formed in parallel to each other in the longitudinal direction of the supply member body 31, and each liquid supply path 36 is independent from each ink cartridge 13 provided for each color of the ink.

Each supply needle 32 is fixed to the surface (one surface) of the supply member body 31, and includes a liquid supply path 38 as a second liquid supply path communicating with the liquid supply path 36. The supply needle 32 is a member used to supply the ink, supplied from the ink cartridge 13, to the supply member body 31. The supply needle 32 includes a flange portion 39 which is formed in the vicinity of the end on the side of the supply member body 31, and the filter 33 is interposed between the flange portion 39 and the supply member body 31.

In addition, an area where the liquid supply path 38 is connected to the liquid supply path 36 is provided with a space having an inner diameter larger than those of other areas, that is, a filter chamber 41 as a wide width portion. In this embodiment, for example, the inner diameter of the filter chamber 41 becomes larger toward the supply member body 31. In addition, the filter chamber 41 is formed to have an inner diameter larger than those of other areas of the liquid supply path 38 so as to reduce the ink passage resistance by increasing the area of the filter 33.

Figure 5:
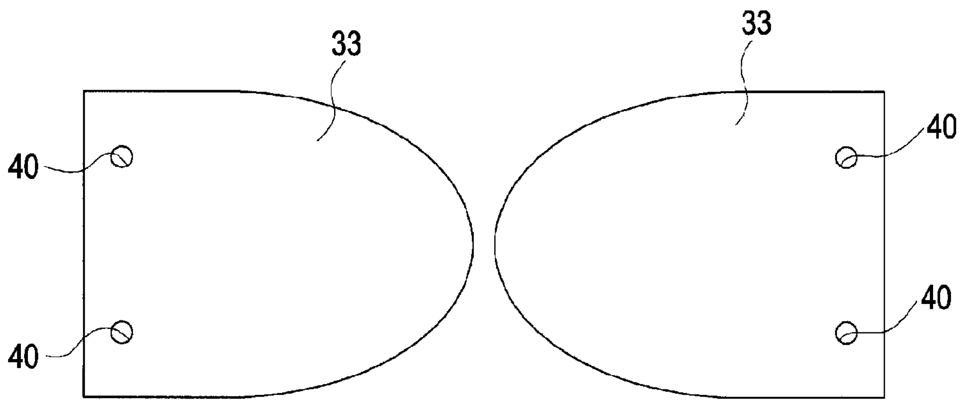
FIG. 5 is a plan view showing only a filter.

The filter 33 is formed in a sheet shape in which metal is minutely woven, and is interposed between the supply member body 31 and the supply needle 32. Here, as shown in FIG. 5 (partially plan view of the filter 33) showing only the filter 33, the filter 33 according to this embodiment has a portion protruding to the outside of an area between the liquid supply paths 36 and 38, where two positioning holes 40 are formed in the outer end thereof so as to allow positioning pins 37 to be inserted therethrough. Here, the positioning pins 37 are formed so as to protrude from the surface of the supply member body 31. In addition, since the positioning operation of the filter 33 is roughly carried out, the positioning holes 40 are formed as large holes. When the positioning holes are formed as the large holes, it is possible to improve the workability upon inserting the positioning pins 37 into the holes of the filter 33. The filter 33 is independently provided for each liquid supply path 36.

In addition, in the state where the filter 33 is positioned by the positioning pins 37, the filter 33 is melt-fixed to the supply member body 31.

The fixed portion 34 is formed by molding in such a manner that a resin material is injected from one surface (in FIG. 4, the front surface) of the supply member body 31, so as to cover a range from a mold gate (described later in detail), formed at a position (in the case shown in FIG. 4, a position between two supply needles 32) where the liquid supply paths 36 and 38 are interposed between the positioning holes 40 of the filters 33 to a part of the supply needle 32. Here, the resin material used for molding flows from the front surface of the supply member body 31 to a concave portion 45, which is formed in the supply member body 31 and of which a part of an opening is blocked by the supply needle 32. The fixed portion 34 formed by solidifying the resin material flowing to the concave portion 45 exhibits an anchor effect between the supply needles 32. In addition to the anchor effect, the supply member body 31, the supply needle 32, and the filter 33 are strongly integrated with each other by the fixed portion 34. In addition, the positioning pin 37 may be formed in the supply needle 32.

Figure 6:
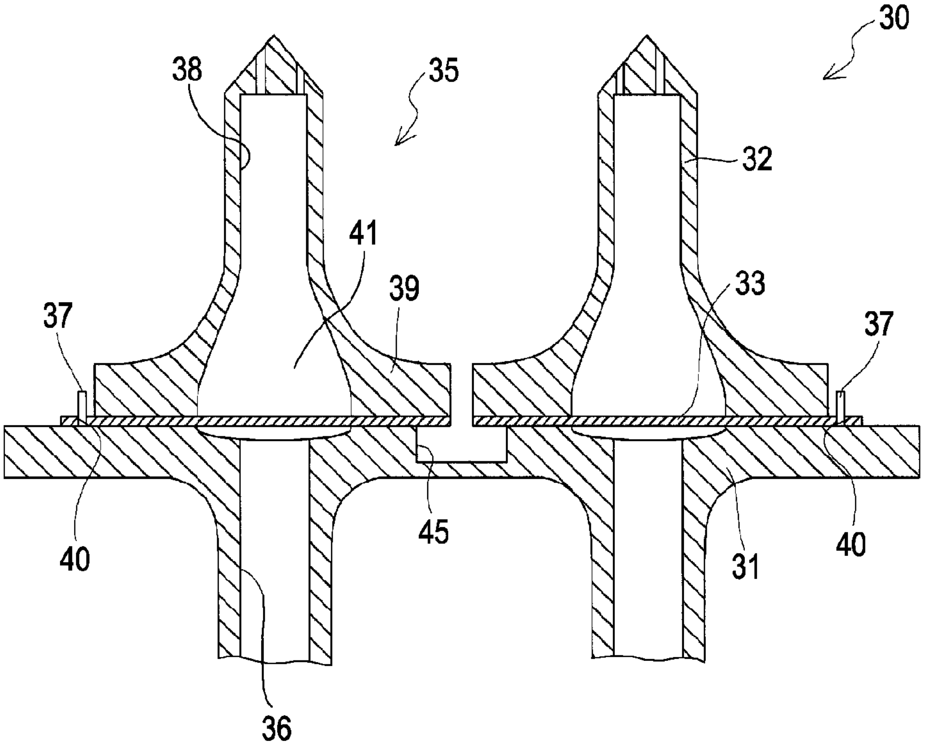
FIG. 6 is a sectional view showing a liquid ejecting head manufacturing method according to the first embodiment of the invention.

Here, particularly, the method of manufacturing the supply member 30 in the ink jet printing head 11 will be described in detail. In addition, FIGS. 6 to 8 are sectional views showing the method of manufacturing the supply member.

First, the positioning pin 37 is inserted into the positioning hole 40 of the filter 33, and the filter 33 is melt-fixed to the supply member body 31 in the state where the filter 33 is positioned to the supply member body 31. Subsequently, as shown in FIG. 6, the supply needle 32 is placed at a predetermined position on the filter 33 so that the filter 33 is interposed between the supply member body 31 and the supply needle 32. In addition, here, the filter 33 may not necessarily be melt-fixed to the supply member body 31, but the supply needle 32 may just be placed on the filter 33 after the positioning operation using the positioning hole 40.

Figure 7:
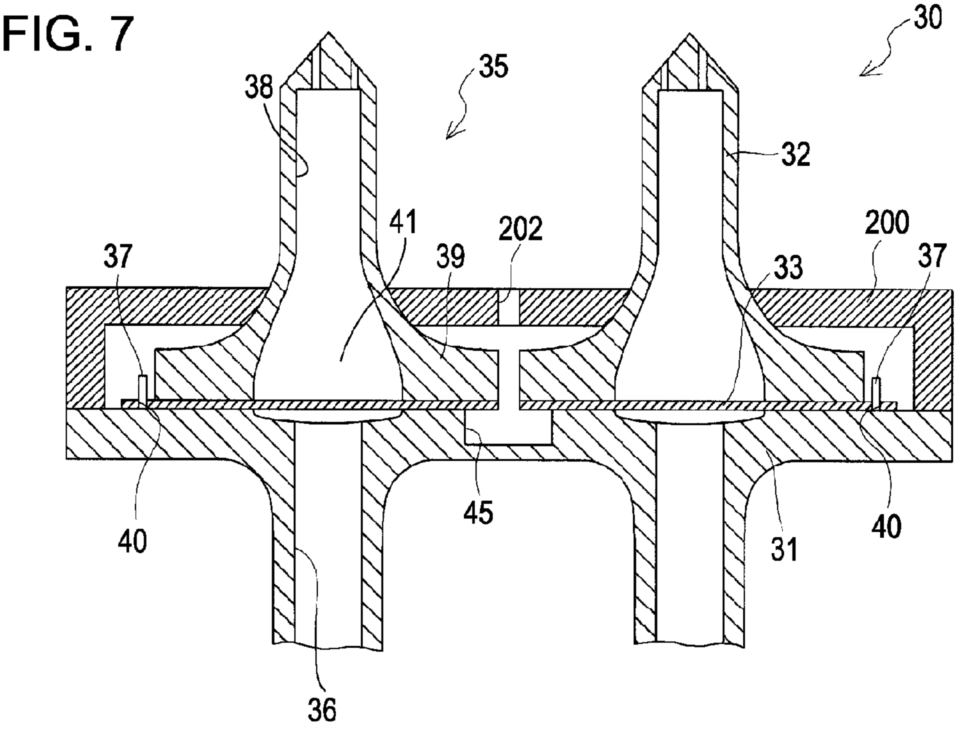
FIG. 7 is a sectional view showing the liquid ejecting head manufacturing method according to the first embodiment of the invention.

Next, as shown in FIG. 7, a mold 200 is set from the upside of one surface (the upside in the drawing) of the supply member body 31. The mold 200 includes an inner space which covers a part of the supply needle 32 and one surface of the supply member body 31, and a gate 202 as a resin material injection port is formed at a position where the liquid supply paths 36 and 38 are interposed between the pins 37 and the positioning holes 40.

Figure 8:
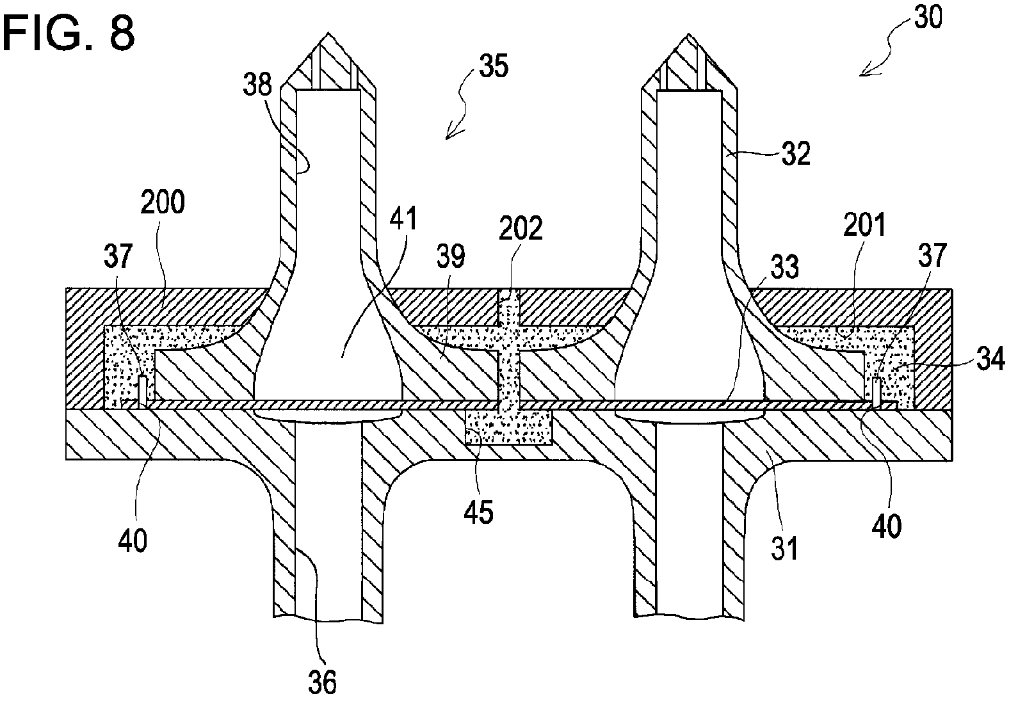
FIG. 8 is a sectional view showing the liquid ejecting head manufacturing method according to the first embodiment of the invention.

In this state, as shown in FIG. 8, the fixed portion 34 is formed by integral molding. In detail, when the melted injection resin is filled into a cavity 201 of the mold 200 through the gate 202 of the mold 200, the fixed portion 34 is molded. Here, the injection resin flows from the cavity 201 to the concave portion 45. As a result, the above-described anchor effect is exhibited by the resin filled in the concave portion 45.

Here, the pin 37 and the positioning hole 40 are formed on the opposite side of a position between the liquid supply paths 36 and 38 with respect to the gate 202. Accordingly, the pin 37 and the positioning hole 40 do not negatively influence the fluidity of the injection resin, injected into the cavity 201 through the gate 202, inside the cavity 201. In addition, in this case, since the cavity 201 is formed as a comparatively large space, it is possible to ensure a large molding resin passageway in the inner periphery of the mold 200, and thus to ensure the satisfactory fluidity of the resin.

According to this embodiment, since the filter 33, the supply member body 31, and the supply needle 32 are integrated with each other by the fixed portion 34 as the resin molded product, it is possible to increase the effective area of the filter 33 and to decrease the gap between the supply needles 32 adjacent to each other. As a result, it is possible to decrease the size of the liquid ejecting head.

In this embodiment, although the pin 37 is formed in the supply member body 31, the pin 37 may be formed in the supply needle 32 and the filter may be positioned and melt-fixed to the supply needle 32. In addition, the pin 37 may be integrated with the supply member body 31 or the supply needle 32. However, the pin 37 may be formed separately from the supply member body 31 or the supply needle 32, and the pin 37 may be mounted to the supply member body 31 or the supply needle 32.

As described above, the head body 220 is formed on the other side of the liquid supply path 36 of the supply member 30, that is, the opposite side of the supply needle 32. Here, the head body 220 will be described. In addition, FIG. 9 is an exploded perspective view showing the head body, and FIG. 10 is a sectional view showing the head body.

Figure 9:
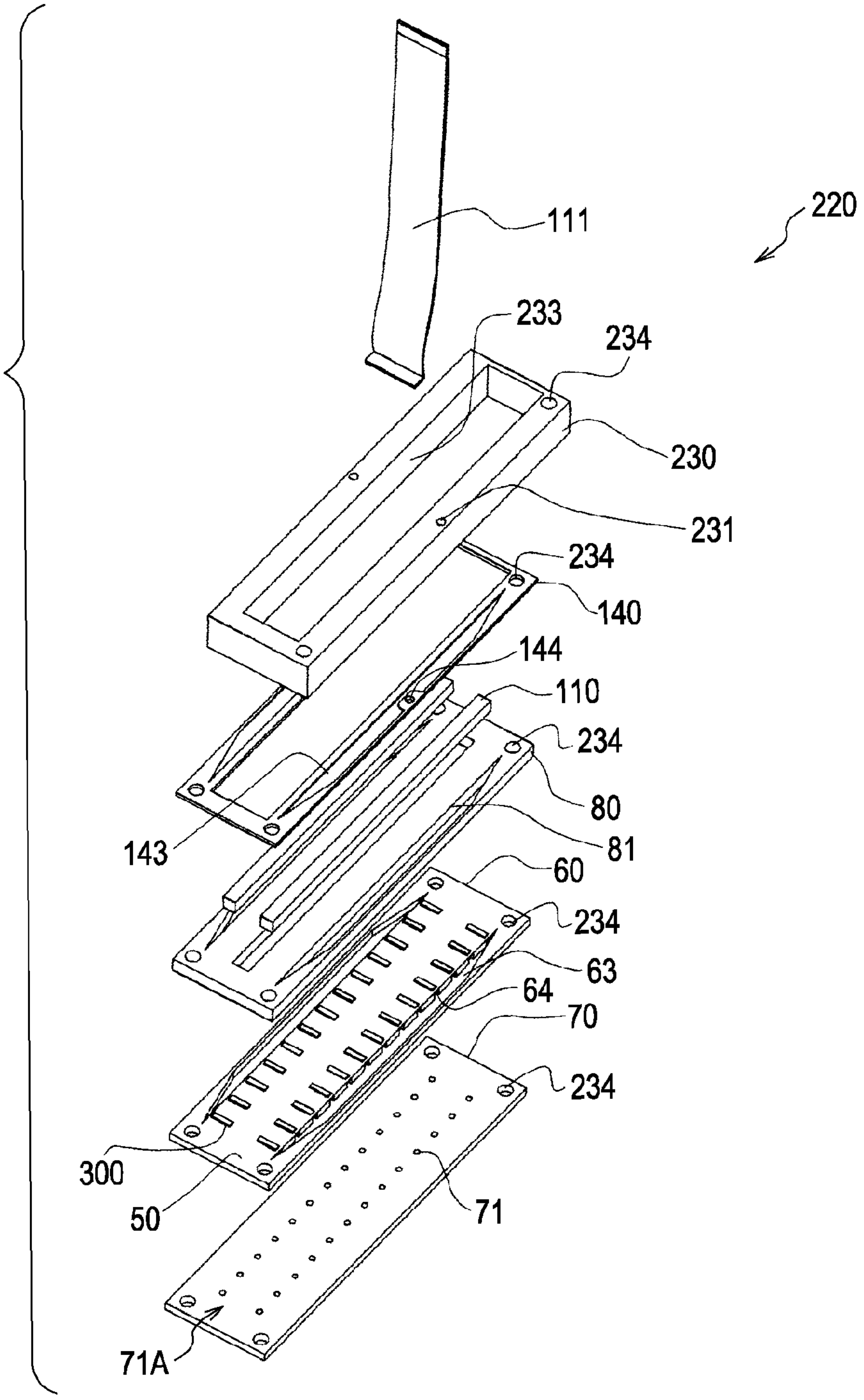
FIG. 9 is an exploded perspective view showing a head body according to the embodiment of the invention.
Figure 10:
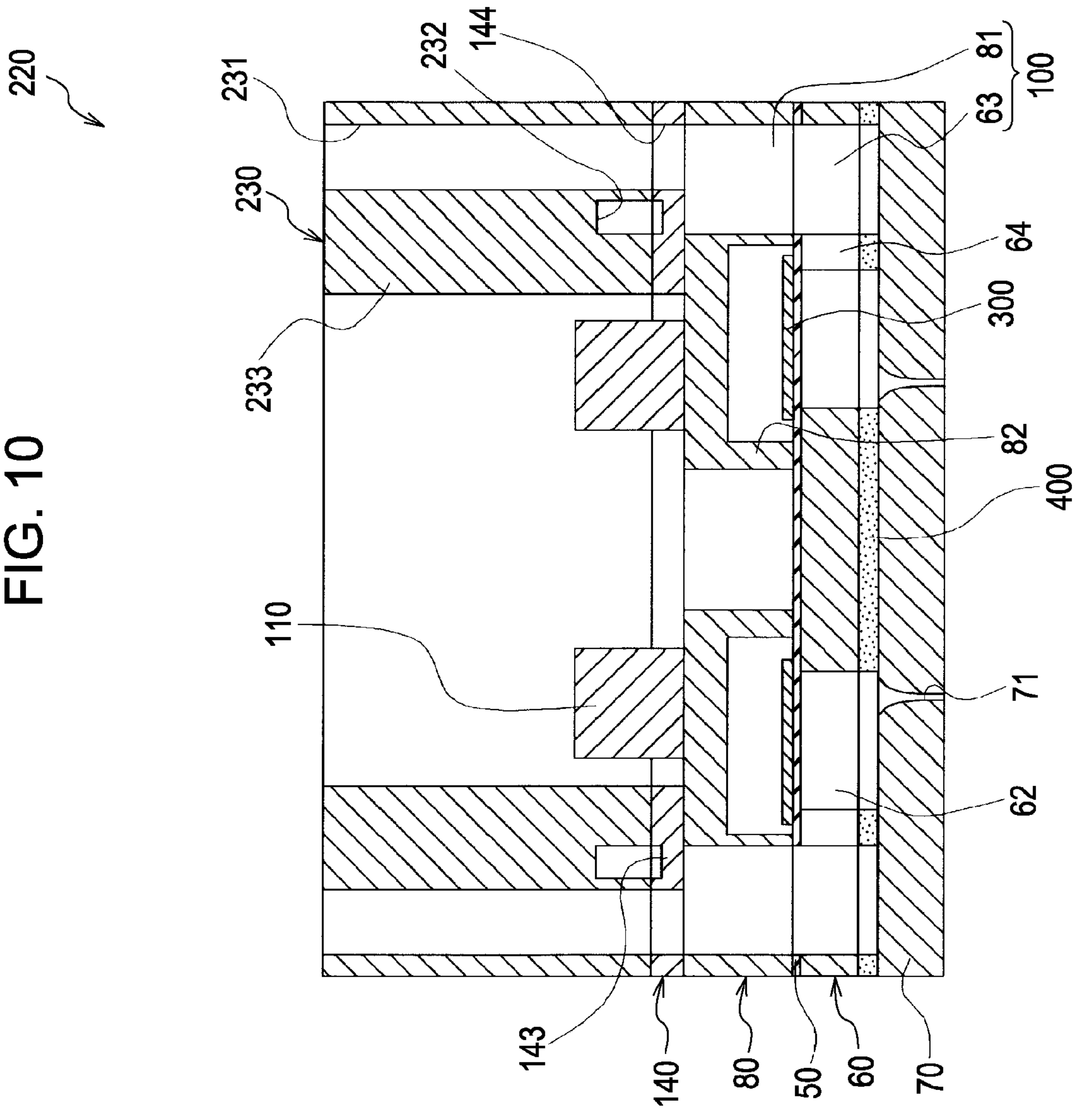
FIG. 10 is a sectional view showing the head body according to the embodiment of the invention.

As shown in FIGS. 9 and 10, in this embodiment, a passageway formation substrate 60 constituting the head body 220 is formed by a silicon single crystal substrate, and has an elastic film 50 formed on one surface thereof by silicon dioxide. By performing anisotropic etching on the other surface of the passageway formation substrate 60, two rows of pressure generating chambers 62 defined by plural dividing walls are formed in parallel in the width direction. In addition, a communication portion 63 is formed on the outside of each pressure generating chamber 62 in the longitudinal direction so as to form a reservoir 100 which communicates with a reservoir portion 81 formed in a reservoir formation substrate 80 to be described later and serves as a common ink chamber of the pressure generating chambers 62. In addition, the communication portion 63 communicates with one end of each pressure generating chamber 62 in the longitudinal direction through an ink supply path 64. That is, in this embodiment, as a liquid passageway formed in the passageway formation substrate 60, the pressure generating chambers 62, the communication portion 63, and the ink supply path 64 are provided.

In addition, a nozzle plate 70 provided with nozzle openings 71 is fixed to the opening surface of the passageway formation substrate 60 through an adhesive 400. In detail, plural nozzle plates 70 are provided so as to correspond to plural head bodies 220. Each nozzle plate 70 is formed to have an area slightly wider than a nozzle opening 241 of a cover head 240 to be described later in detail, and is fixed to an area overlapping with the cover head 240 by an adhesive or the like. In addition, each nozzle opening 71 of the nozzle plate 70 is punched at a position communicating with the opposite side of the ink supply path 64 of each pressure generating chamber 62. In this embodiment, since two rows of pressure generating chambers 62 are formed in parallel in the passageway formation substrate 60, two rows of nozzle rows 71A provided with the parallel nozzle openings 71 are formed in one head body 220. In addition, in this embodiment, the surface where the nozzle opening 71 of the nozzle plate 70 is opened is formed as a liquid ejecting surface. As such a nozzle plate 70, for example, a metallic substrate such as stainless steel (SUS) or a silicon single crystal substrate may be exemplified.

Meanwhile, piezoelectric elements 300 are formed on the elastic film 50 on the opposite side of the opening surface of the passageway formation substrate 60, where each piezoelectric element 300 is formed by sequentially laminating a lower electrode film formed by metal, a piezoelectric layer formed by a piezoelectric material such as lead zirconium titanate (PZT), and an upper electrode film formed by metal.

The reservoir formation substrate 80 having the reservoir portion 81 forming at least a part of the reservoir 100 is bonded onto the passageway formation substrate 60 provided with the piezoelectric elements 300. In this embodiment, the reservoir portion 81 is formed along the width direction of the pressure generating chamber 62 by penetrating the reservoir formation substrate 80 in the thickness direction thereof, thereby forming the above-described reservoir 100 which communicates with the communication portion 63 of the passageway formation substrate 60 and serves as the common ink chamber of the pressure generating chambers 62.

A piezoelectric element holding portion 82 having a space which does not disturb the movements of the piezoelectric elements 300 is formed in an area of the reservoir formation substrate 80 facing the piezoelectric elements 300.

In addition, a driving circuit 110 including a semiconductor integrated circuit (IC) and the like for driving the piezoelectric elements 300 is formed on the reservoir formation substrate 80. Each terminal of the driving circuit 110 is connected to a wiring drawn out from each electrode of the piezoelectric element 300 through a bonding wire (not shown). In addition, each terminal of the driving circuit 110 is connected to an external device through an external wiring 111 of a flexible print substrate (FPC) or the like, and receives various signals such as printing signals through the external wiring 111.

A compliance substrate 140 is bonded onto the reservoir formation substrate 80. An ink introduction port 144 for supplying ink to the reservoir 100 is formed in an area of the compliance substrate 140 facing the reservoir 100 by penetrating the area in the thickness direction. In addition, a flexible portion 143, which is thin in the thickness direction, is formed in areas except for the ink introduction port 144 in the area of the compliance substrate 140 facing the reservoir 100, and the reservoir 100 is sealed by the flexible portion 143. The flexible portion 143 applies compliance to the inside of the reservoir 100.

A head casing 230 is fixed onto the compliance substrate 140.

The head casing 230 includes an ink supply communication path 231 which communicates with the ink supply port 144 and communicates with the liquid supply path 36 of the supply member 30 so as to supply ink from the supply member 30 to the ink supply port 144. A groove portion 232 is formed in an area of the head casing 230 facing the flexible portion 143 of the compliance substrate 140, and the flexible portion 143 is appropriately bent. In addition, a driving circuit holding portion 233 is formed in an area of the head casing 230 facing the driving circuit 110 formed on the reservoir formation substrate 80 so as to penetrate the area in the thickness direction, and the external wiring 111 is connected to the driving circuit 110 so as to be inserted through the driving circuit holding portion 233.

In addition, as shown in FIG. 2, the head bodies 220 held by the supply member 30 through the head casing 230 are relatively positioned and held by the box-shaped cover head 240 so as to cover the liquid ejecting surfaces of five head bodies 220. The cover head 240 includes nozzle opening portions 241 in which the nozzle openings 71 are opened and a bonding portion 242 which divides the nozzle opening portions 241 and is bonded to at least both ends of each liquid ejecting surface of the head body 220 provided with the parallel nozzle rows 71A formed by the nozzle openings 71.

In this embodiment, the bonding portion 242 includes a frame portion 243 which is formed along the outer periphery of the liquid ejecting surface of each head body 220 and a beam portion 244 which extends to a position between the adjacent head bodies 220 so as to divide the nozzle opening portions 241, where the frame portion 243 and the beam portion 244 are bonded to the liquid ejecting surface of the head body 220, that is, the surface of the nozzle plate 70.

In addition, the cover head 240 is provided with a side wall portion 245 which is formed on the side of the side surface of the liquid ejecting surface of the head body 220 so as to extend to be bent along the outer peripheral edge of the liquid ejecting surface.

Likewise, since the bonding portion 242 of the cover head 240 is bonded to the liquid ejecting surface of the head body 220, it is possible to decrease an uneven degree between the liquid ejecting surface and the cover head 240. Accordingly, even when a wiping operation, a suction operation, or the like is performed on the liquid ejecting surface, it is possible to prevent the ink from remaining in the liquid ejecting surface. In addition, since a gap between the adjacent head bodies 220 is blocked by the beam portion 244, the ink does not enter a gap between the adjacent head bodies 220. Accordingly, it is possible to prevent the piezoelectric elements 300, the driving circuits 110, or the like are from being deteriorated or broken. In addition, since the liquid ejecting surface of the head body 220 is adhered to the cover head 240 by an adhesive so that a gap is not formed therebetween, the printing medium S is prevented from entering the gap. Accordingly, it is possible to prevent the cover head 240 from being deformed and to prevent the paper sheet from being jammed. Further, since the side wall portion 245 covers the outer peripheral edges of plural head bodies 220, it is possible to reliably prevent the entrance of the ink through the side surface of the head body 220. Moreover, since the cover head 240 is provided with the bonding portion 242 bonded to the liquid ejecting surface of the head body 220, it is possible to highly precisely position and bond the nozzle rows 71A of plural head bodies 220 to the cover head 240.

As such a cover head 240, for example, a metal material such as stainless steel may be exemplified. Also, the cover head 240 may be formed by performing a pressing process on a metallic plate, or may be formed by molding. In addition, since the cover head 240 is formed by a conductive metallic material, the cover head 240 can be grounded. Further, the method of bonding the cover head 240 to the nozzle plate 70 is not particularly limited. For example, the bonding operation may be carried out by using a thermosetting epoxy-based adhesive or an ultraviolet cure adhesive.

In the ink jet printing head 11 according to this embodiment, the ink is supplied from the ink cartridge 13 to the ink supply path 36, and the ink is filled through the ink supply communication path 231 and the ink supply port 144 until the ink reaches from the reservoir 100 to the nozzle opening 71. Then, a voltage is applied to the piezoelectric elements 300 corresponding to the pressure generating chambers 62 in accordance with the printing signal from the driving circuit 110 so as to bend the elastic film 50 and the piezoelectric elements 300. Accordingly, the pressure inside the pressure generating chambers 62 increases to thereby eject the ink droplets from the nozzle openings 71.

Second Embodiment

As described above, the liquid ejecting head formed by the liquid ejecting head manufacturing method according to the first embodiment of the invention is described, but the structure of the fixed portion 34 is not limited to the examples shown in FIGS. 2 to 4. The second embodiment in which the structure of the fixed portion is different will be described with reference to FIGS. 11 to 15. In addition, the same reference numerals will be given to the same constituents as those of the above-described embodiment, and the repetitive description thereof will be omitted.

Figure 11:
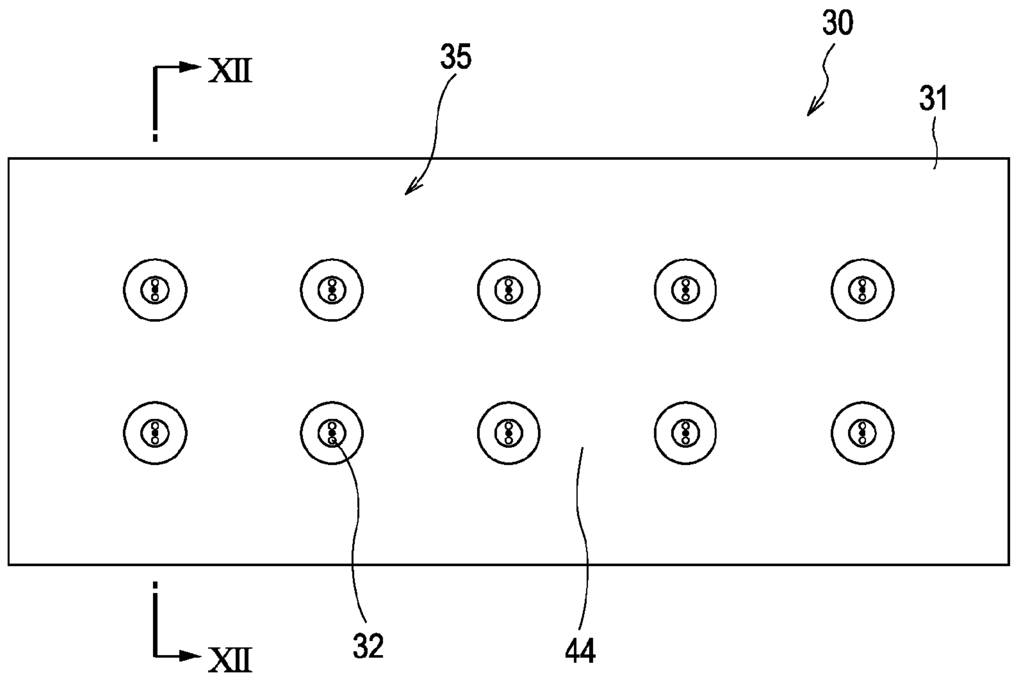
FIG. 11 is a plan view showing the supply member according to the second embodiment of the invention.
Figure 12:
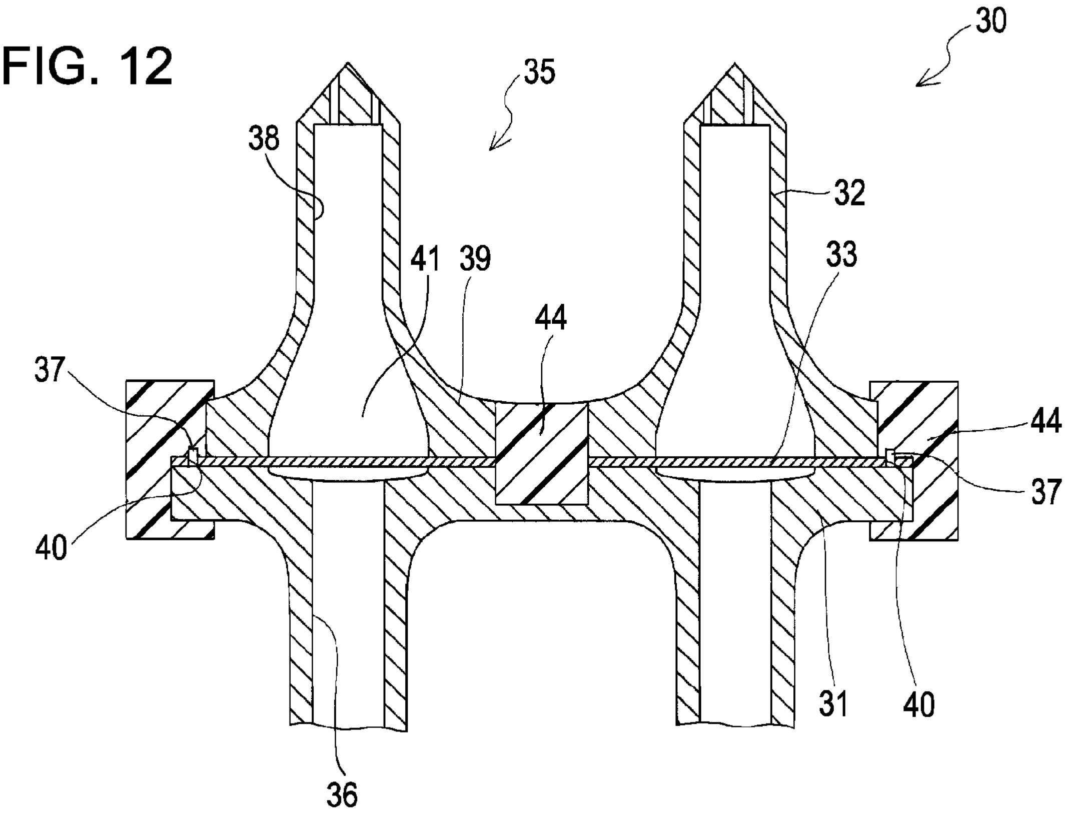
FIG. 12 is an enlarged sectional view taken along the line XII-XII in FIG. 11.

FIG. 11 is a plan view showing the supply member, and FIG. 12 is an enlarged sectional view taken along the line XII-XII in FIG. 11.

As shown in FIGS. 11 and 12, a fixed portion 44 according to this embodiment surrounds the peripheries of the supply needles 32 so as to have the portion from the supply member body 31 to the supply needles 32 in the outer peripheries of the supply needles 32 and the supply member body 31. As a result, the supply member body 31 and the supply needles 32 are reliably fixed by the fixed portion 44, thereby reliably fixing the filter 33 between the supply member body 31 and each supply needle 32.

Figure 13:
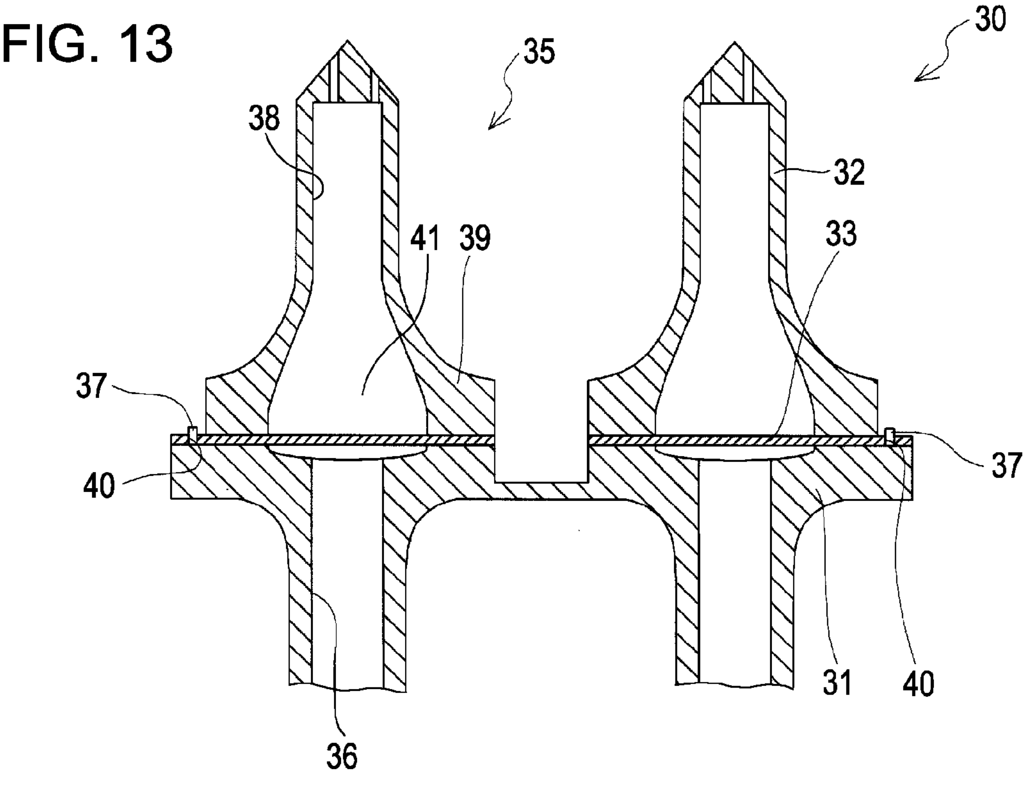
FIG. 13 is a sectional view showing the liquid ejecting head manufacturing method according to the second embodiment of the invention.
Figure 14:
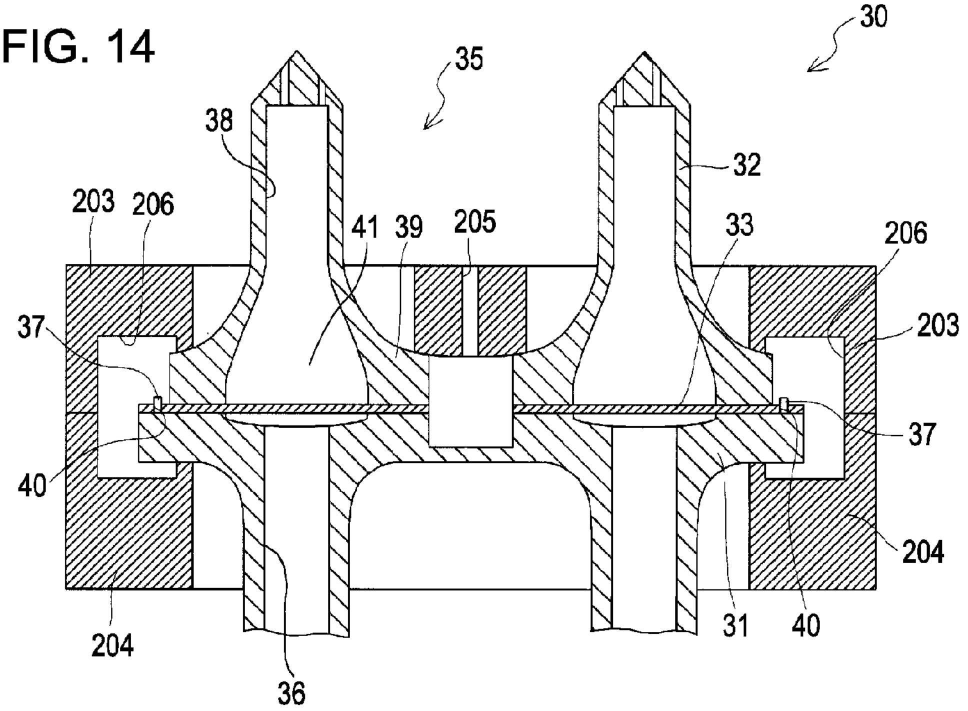
FIG. 14 is a sectional view showing the liquid ejecting head manufacturing method according to the second embodiment of the invention.
Figure 15:
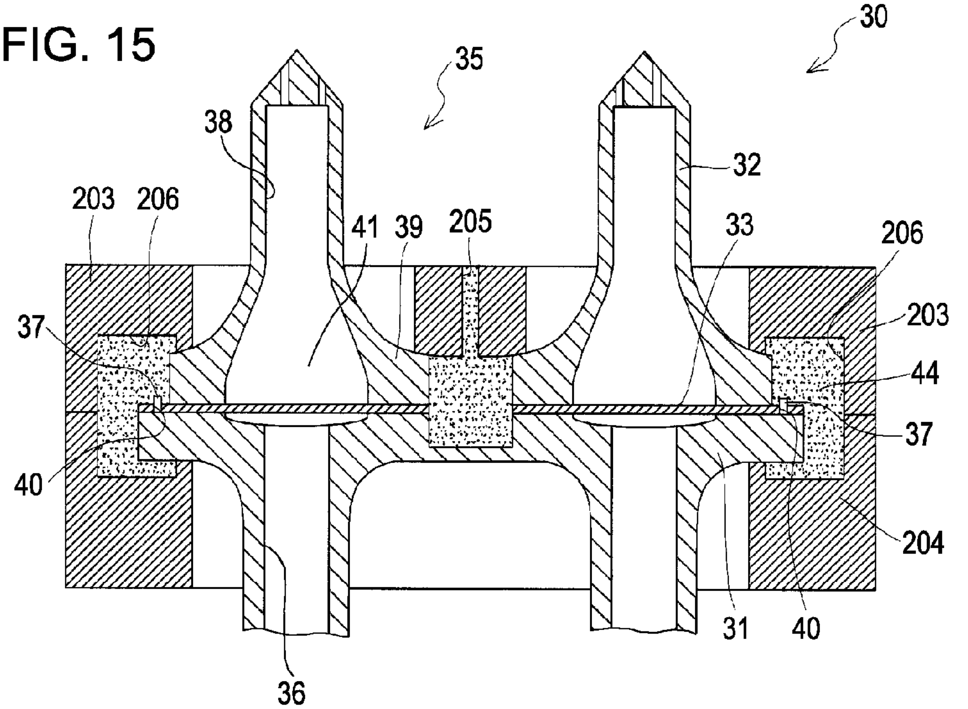
FIG. 15 is a sectional view showing the liquid ejecting head manufacturing method according to the second embodiment of the invention.

Here, the method of manufacturing the supply member including the fixed portion 44 will be described in detail with reference to FIGS. 13 to 15. In addition, FIGS. 13 to 15 are sectional views showing the method of manufacturing the supply member. However, in FIGS. 13 to 15, the same reference numerals will be given to the same constituents as those in FIGS. 6 to 8, and the repetitive description thereof will be omitted.

First, in the same manner as the above-described embodiment, the filter 33 is melt-fixed to the supply member body 31 in the state where the filter 33 is positioned to the supply member body 31. Then, as shown in FIG. 13, the supply needle 32 is placed at a predetermined position on the filter 33 so that the filter 33 is interposed between the supply member body 31 and the supply needle 32.

Next, as shown in FIG. 14, a mold 203 is set from the upside of one surface (the upside in the drawing) of the supply member body 31, and a mold 204 is set from the downside of the other surface (the downside in the drawing) of the supply member body 31. Accordingly, a cavity 206 is formed from the other surface (the downside in the drawing) of the supply member body 31 to the supply needle 32 formed on one surface of the supply member body 31 by the molds 203 and 204. Meanwhile, the mold 203 is provided with a gate 205 as a resin material injection port which is formed at a position where the liquid supply paths 36 and 38 are interposed between the pins 37 and the positioning holes 40.

In this state, as shown in FIG. 15, the fixed portion 44 is formed by integral molding. In detail, when the melted injection resin is filled into the cavity 206 of the mold 200 through the gate 205 of the mold 203, the fixed portion 44 is molded.

Here, the pin 37 and the positioning hole 40 are formed on the opposite side of a position between the liquid supply paths 36 and 38 with respect to the gate 205. Accordingly, the pin 37 and the positioning hole 40 do not negatively influence the fluidity of the injection resin, injected into the cavity 206 through the gate 205, inside the cavity 206.

Further, according to this embodiment, since both the supply member body 31 and the supply needle 32 are fixed by the fixed portion 44 as the resin molded product, both the supply member body 31 and the supply needle 32 are reliably integrated with each other.

Furthermore, in this embodiment, although the pin 37 is formed in the supply member body 31, the pin 37 may be formed in the supply needle 32 and the filter may be positioned and melt-fixed to the supply needle 32. In addition, the pin 37 may be integrated with the supply member body 31 or the supply needle 32. However, the pin 37 may be formed separately from the supply member body 31 or the supply needle 32, and the pin 37 may be mounted to the supply member body 31 or the supply needle 32.

Third Embodiment

In this embodiment, the structure of the supply member is different from those of the first and second embodiments. That is, only the structure of the supply member of the printing head shown in FIG. 2 is different, and the other structures are the same as those of the first and second embodiments. Thus, the same reference numerals will be given to the same constituents as those shown in FIGS. 1 and 2, and the supply member 30A will be described in detail with reference to FIGS. 16 and 17. Here, FIG. 16 is a plan view showing the supply member, and FIG. 17 is an enlarged sectional view taken along the line XVII-XVII in FIG. 16.

Figure 16:
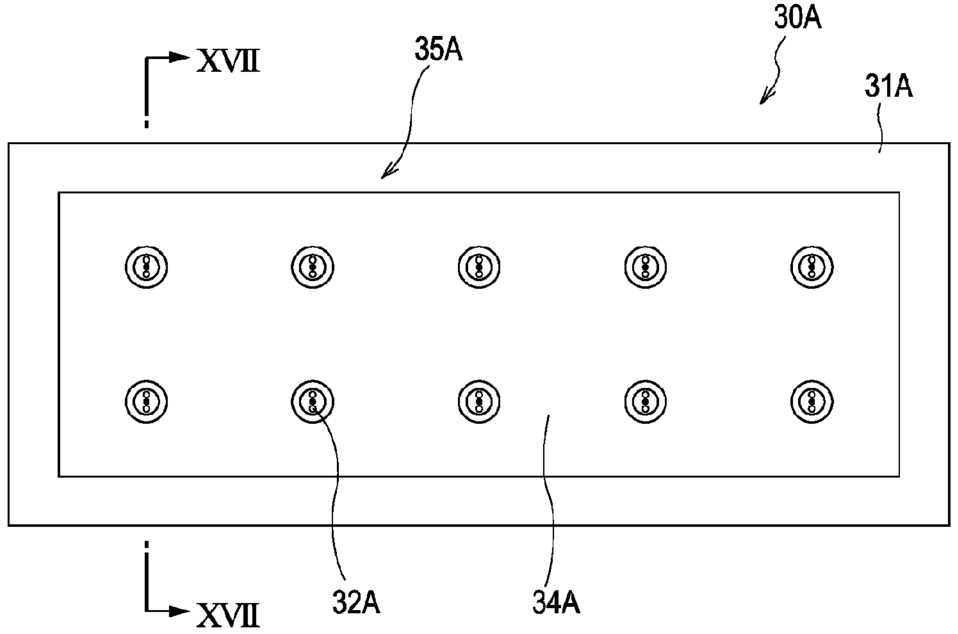
FIG. 16 is a plan view showing the supply member according to the third embodiment of the invention.
Figure 17:
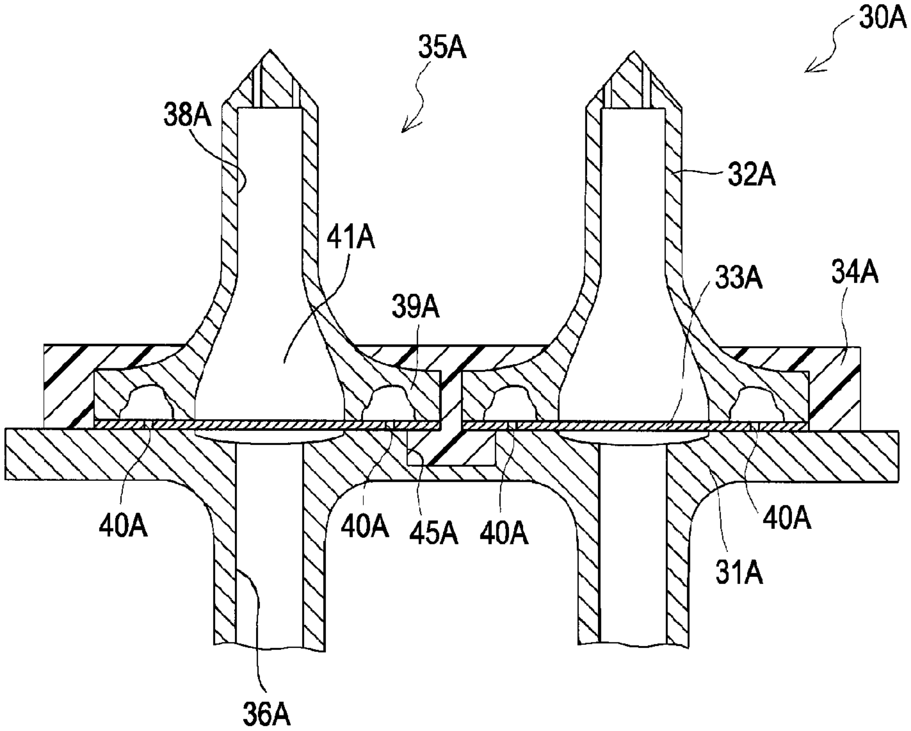
FIG. 17 is an enlarged sectional view taken along the line XVII-XVII in FIG. 16.

As shown in FIGS. 16 and 17, a supply member 30A includes a supply member body 31A which is a first supply member; supply needles 32A which are second supply members formed on one surface of the supply member body 31A; a filter 33A which is formed between the supply member body 31A and each supply needle 32A; and a fixed portion 34A which is formed on one surface of the supply member body 31A so that the filters 33A, the supply member body 31A, and the supply needles 32A are integrated with each other.

The supply member 30A includes a supply body forming portion 35A formed on one surface thereof so as to mount the above-described ink cartridges 13 thereon. The supply body forming portion 35A may not be a type in which the ink cartridges 13 are mounted, but may be a type in which ink is introduced from the liquid storing members into the supply body forming portion 35A through a tube.

The supply member body 31A is provided with liquid supply paths 36A as first liquid supply paths each of which is formed on the downstream side of each filter 33A to be described later so that one end thereof is opened to the supply body forming portion 35A and the other end thereof is opened to each head body 220, where the first liquid supply paths are used to supply the ink from the ink cartridge 13 to the head body 220. Here, a plurality of the liquid supply paths 36A are formed in parallel to each other in the longitudinal direction of the supply member body 31A, and each liquid supply path 36A is independent from each ink cartridge 13 provided for each color of the ink.

Each supply needle 32A is fixed to the surface (one surface) of the supply member body 31A, and includes a liquid supply path 38A as a second liquid supply path communicating with the liquid supply path 36A. The supply needle 32A is a member used to supply the ink, supplied from the ink cartridge 13, to the supply member body 31A. The supply needle 32A includes a flange portion 39A which is formed in the vicinity of the end on the side of the supply member body 31A, and the filter 33A is interposed between the flange portion 39A and the supply member body 31A.

In addition, an area where the liquid supply path 38A is connected to the liquid supply path 36A is provided with a space having an inner diameter larger than those of other areas, that is, a filter chamber 41A as a wide width portion. In this embodiment, for example, the inner diameter of the filter chamber 41A becomes larger toward the supply member body 31A. In addition, the filter chamber 41A is formed to have an inner diameter larger than those of other areas of the liquid supply path 38A so as to reduce the ink passage resistance by increasing the area of the filter 33A.

Figure 18A:
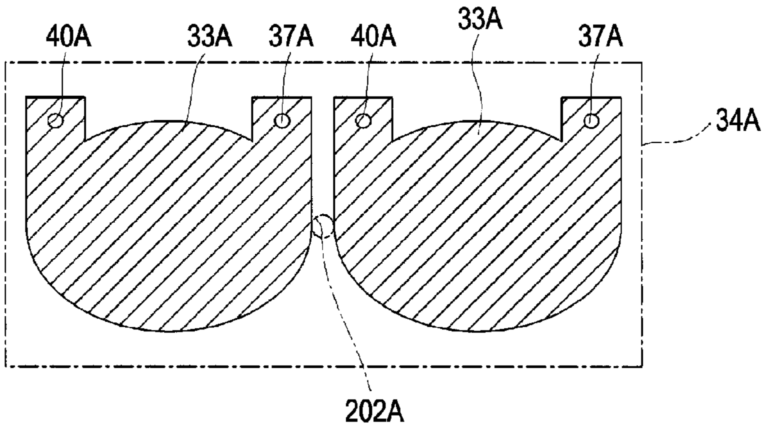
FIGS. 18A to 18C are plan views showing only the filter.

The filter 33A is formed in a sheet shape in which metal is minutely woven, and is interposed between the supply member 31A and the supply needle 32A. Here, as shown in FIG. 18A (partially plan view of the filter 33A) showing only the filter 33A, the filter 33A according to this embodiment has a size protruding to the outside of a portion interposed between the supply member body 31A and the supply needle 32A, where two positioning holes 40A are formed so as to allow positioning pins 37A (which is not shown in FIG. 17) to be inserted therethrough during the manufacturing process. Here, the positioning pins 37A are formed so as to be thin and to protrude from the surface of the supply member body 31A (in the case shown in FIG. 17, the pin 37A is melted away). In addition, since the positioning operation of the filter 33A is roughly carried out, the positioning holes 40A are formed as large holes. When the positioning holes are formed as the large holes, it is possible to improve the workability upon inserting the positioning pins 37A into the holes of the filter 33A. The filter 33A is independently provided for each liquid supply path 36A.

Figure 18B:
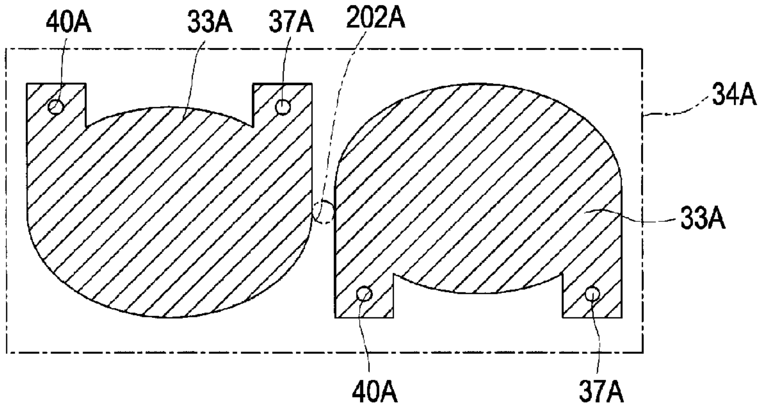
Figure 18C:
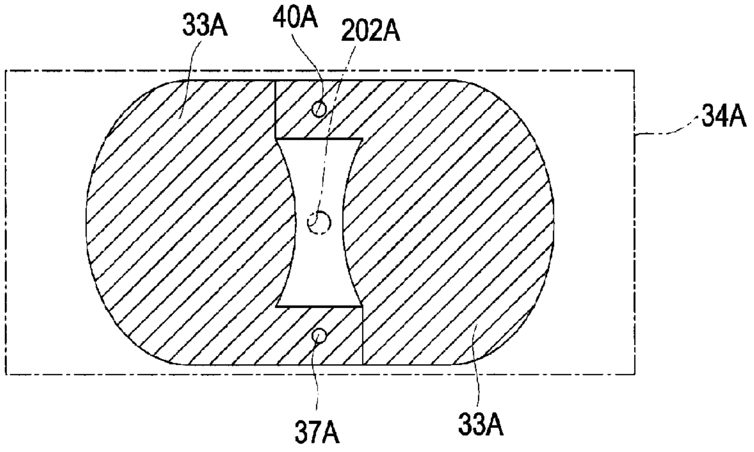

The arrangement shape of the filter 33A and particularly the position of the positioning hole 40A are not particularly limited. Accordingly, various examples may be supposed other than the example shown in FIG. 18A. However, since the positioning pin 37A needs to be melted during the resin material filling operation, it is desirable that the positioning pin 37A is formed in the vicinity of the gate 202A which is the supply port for injecting the resin material therethrough. Another arrangement shape of the filter 33A in consideration of this desirable arrangement is shown in FIGS. 18B and 18C. FIG. 18B shows the case in which the filters 33A are arranged so as to be point-symmetrical to each other with respect to the gate 202A. In addition, FIG. 18C shows the case in which one pin 37A is used for two filters 33A. That is, in this case, the pin 37A is inserted into one positioning hole 40A and the other positioning pin 40A of two filters 33A.

The fixed portion 34A is formed by molding in such a manner that a resin material is injected from one surface (in FIG. 17, the front surface) of the supply member body 31A, so as to cover a range from a mold gate 202A (see FIGS. 18A to 18C), formed at a position (in the case shown in FIG. 17, a position between two supply needles 32A) where the liquid supply paths 36A and 38A are interposed between the positioning holes 40A of the filters 33A to a part of the supply needle 32A. Here, the resin material used for molding flows from the front surface of the supply member body 31A to a concave portion 45A, which is formed in the supply member body 31A and of which a part of an opening is blocked by the supply needle 32A. The fixed portion 34A formed by solidifying the resin material flowing to the concave portion 45A exhibits an anchor effect between the supply needles 32A. In addition to the anchor effect, the supply member body 31A, the supply needle 32A, and the filter 33A are strongly integrated with each other by the fixed portion 34A.

Figure 19:
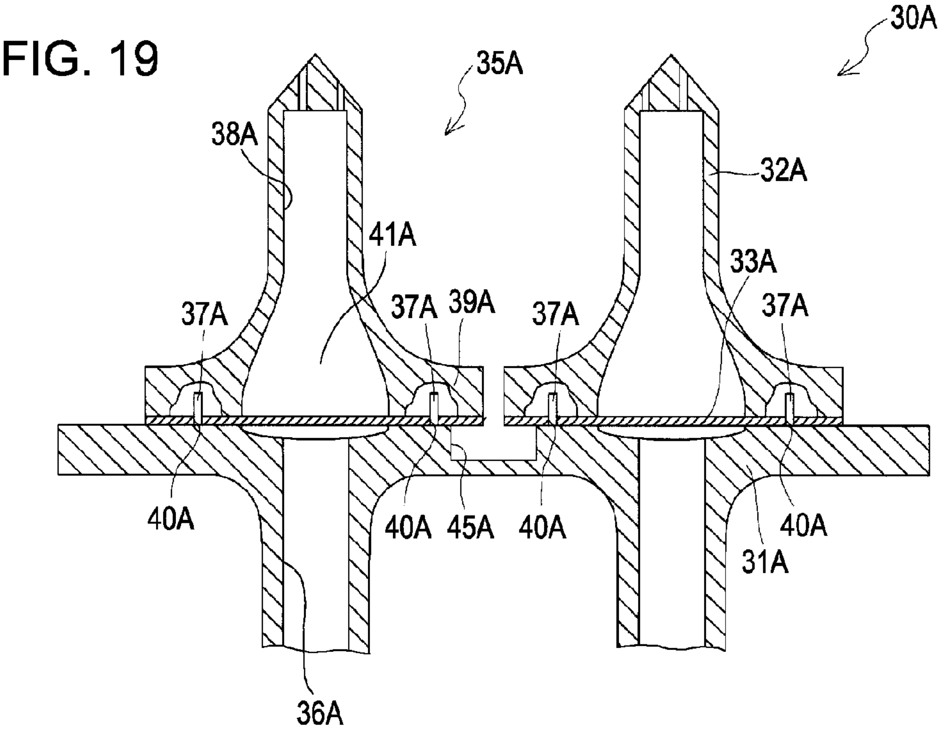
FIG. 19 is a sectional view showing the liquid ejecting head manufacturing method according to the third embodiment of the invention.

Here, particularly, the method of manufacturing the supply member 30A in the ink jet printing head 11 will be described in detail. In addition, FIGS. 19 to 21 are sectional views showing the method of manufacturing the supply member.

First, the positioning pin 37A is inserted into the positioning hole 40A of the filter 33A, and the filter 33A is melt-fixed to the supply member body 31A in the state where the filter 33A is positioned to the supply member body 31A. Subsequently, as shown in FIG. 19, the supply needle 32A is placed at a predetermined position on the filter 33A so that the filter 33A is interposed between the supply member body 31A and the supply needle 32A. In addition, here, the filter 33A may not necessarily be melt-fixed to the supply member body 31A, but the supply needle 32A may just be placed on the filter 33A after the positioning operation using the positioning hole 40A. In this case, the pin 37A may be disposed in the supply needle 32A.

Figure 20:
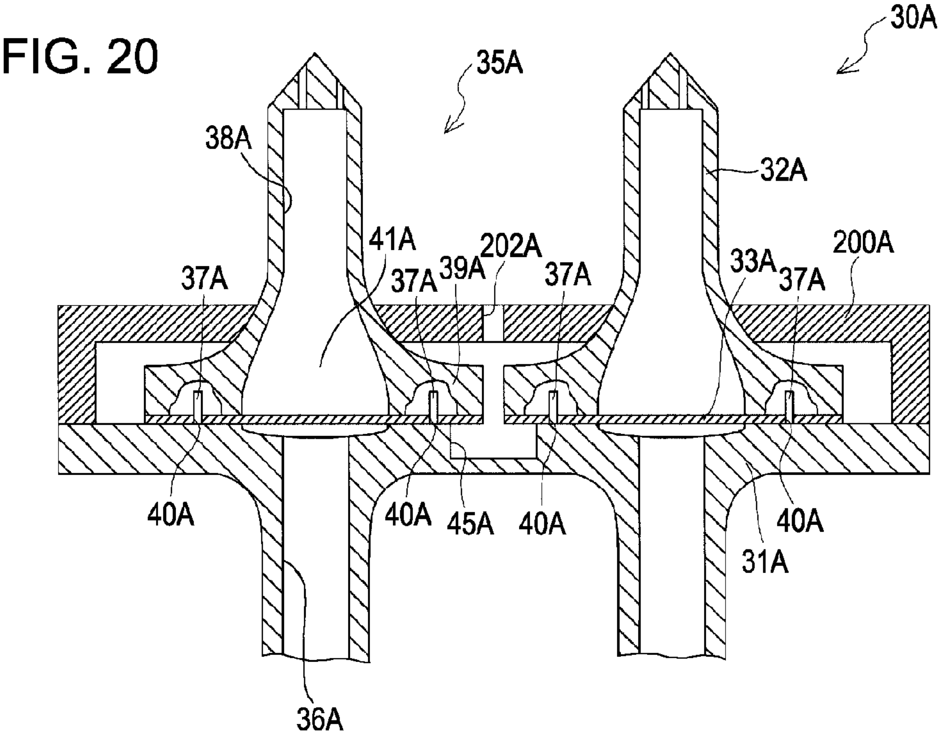
FIG. 20 is a sectional view showing the liquid ejecting head manufacturing method according to the third embodiment of the invention.

Next, as shown in FIG. 20, a mold 200A is set from the upside of one surface (the upside in the drawing) of the supply member body 31A. The mold 200A includes an inner space which covers a part of the supply needle 32A and one surface of the supply member body 31A, and a gate 202A as a resin material injection port which is formed between two supply needles 32A and 32A. The position of the gate 202A is not particularly limited. However, in consideration of the fluidity of the injection resin, it is desirable that the gate 202A is formed at a position corresponding to the center portion of the supply member body 31A as in this embodiment. In addition, the gate 202A may be formed at plural positions.

Figure 21:
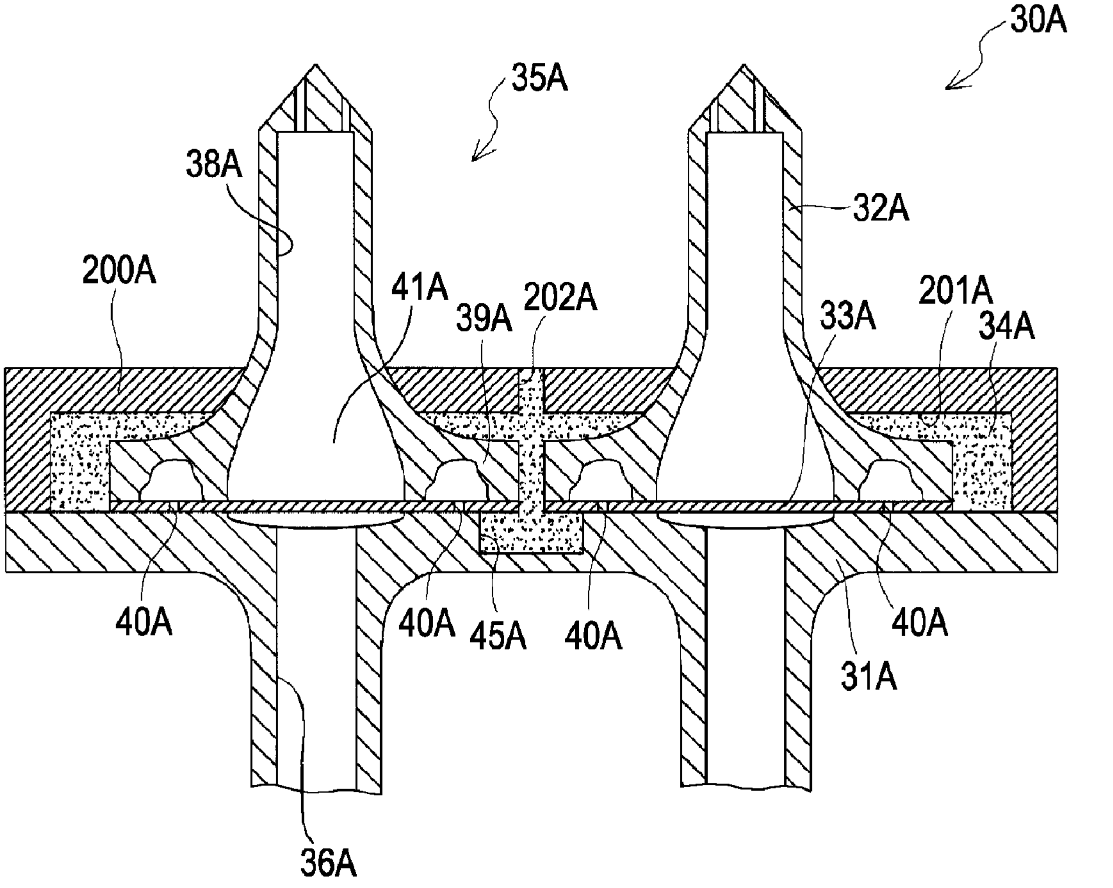
FIG. 21 is a sectional view showing the liquid ejecting head manufacturing method according to the third embodiment of the invention.

In this state, as shown in FIG. 21, the fixed portion 34A is formed by integral molding. In detail, when the melted injection resin is filled into a cavity 201A of the mold 200A through the gate 202A of the mold 200A, the fixed portion 34A is molded. In this case, since the pin 37A is thin so as to be melted by the heat of the injection resin, the pin 37A is melted away by the contact with the injection resin. Accordingly, the pin 37A does not disturb the flow of the resin.

In addition, the injection resin flows from the cavity 201A to the concave portion 45A. As a result, the above-described anchor effect is exhibited by the resin filled in the concave portion 45A.

In this case, since the cavity 201A is formed as a comparatively large space, it is possible to ensure a large molding resin passageway in the inner periphery of the mold 200A, and thus to ensure the satisfactory fluidity of the resin.

According to this embodiment, since the filter 33A, the supply member body 31A, and the supply needle 32A are integrated with each other by the fixed portion 34A as the resin molded product, it is possible to increase the effective area of the filter 33A and to decrease the gap between the supply needles 32A adjacent to each other. As a result, it is possible to decrease the size of the liquid ejecting head.

As described above, the head body 220 is formed on the other side of the liquid supply path 36A of the supply member 30A, that is, the opposite side of the supply needle 32A. Since the head body 220 is the same as that shown in FIGS. 9 and 10, here the description thereof will be omitted.

Further, in this embodiment, although the pin 37A is formed in the supply member body 31A, the pin 37A may be formed in the supply needle 32A and the filter 33A may be positioned and melt-fixed to the supply needle 32A. In addition, the pin 37A may be integrated with the supply member body 31A or the supply needle 32A. However, the pin 37A may be formed as a separate member having a melting point lower than those of the supply member body 31A and the supply needle 32A, and the pin 37A may be mounted to the supply member body 31A or the supply needle 32A. Since the melting point of the pin 37A is low, it is possible to easily melt the pin 37A without forming the pin 37A to be thin. Also, since the melting points of the supply member body 31A and the supply needle 32A are high, it is possible to prevent the supply member body 31A and the supply needle 32A from being deformed during the resin injection operation.

Fourth Embodiment

The structure of the fixed portion 34A is not limited to the examples shown in FIGS. 16 and 17. The fourth embodiment in which the structure of the fixed portion is different will be described with reference to FIGS. 22 to 26. In addition, the same reference numerals will be given to the same constituents as those of the third embodiment, and the repetitive description thereof will be omitted.

Figure 22:
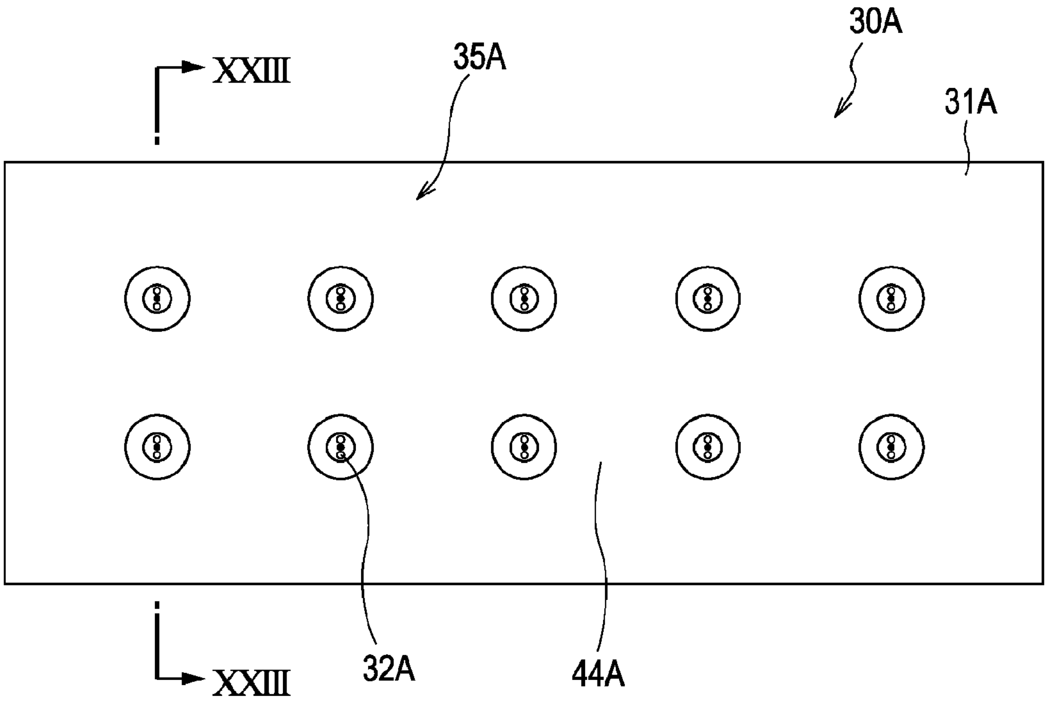
FIG. 22 is a plan view showing the supply member according to the fourth embodiment of the invention.
Figure 23:
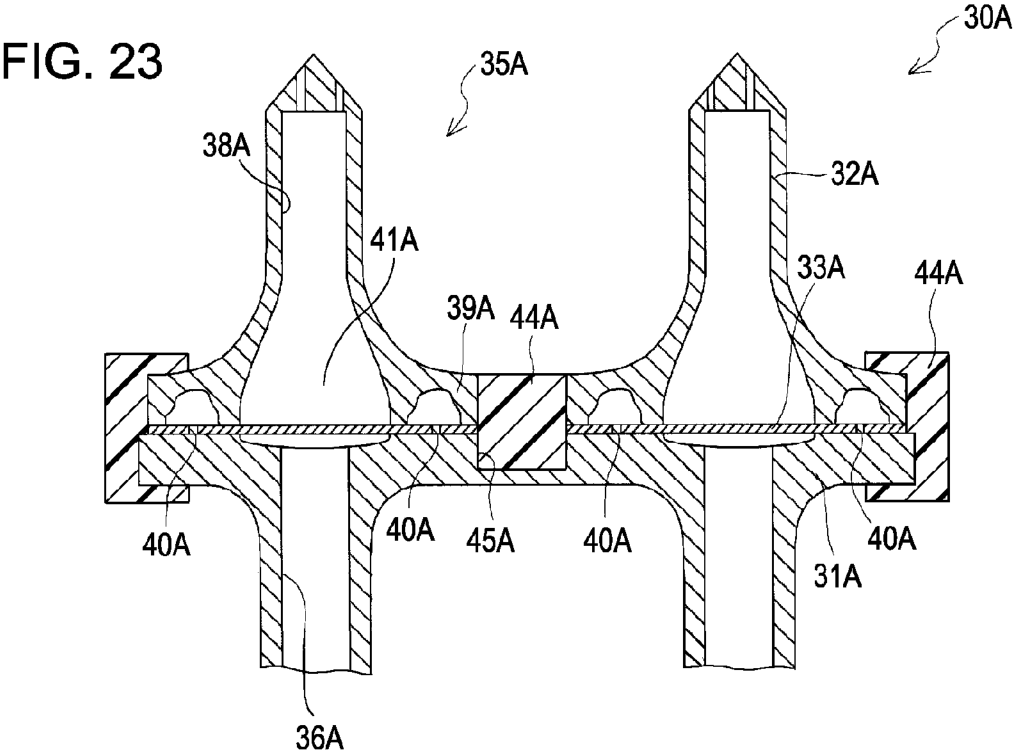
FIG. 23 is an enlarged sectional view taken along the line XXIII-XXIII in FIG. 22.

FIG. 22 is a plan view showing the supply member, and FIG. 23 is an enlarged sectional view taken along the line XXIII-XXIII in FIG. 22.

As shown in FIGS. 22 and 23, a fixed portion 44A according to this embodiment surrounds the peripheries of the supply needles 32A so as to have the portion from the supply member body 31A to the supply needles 32A in the outer peripheries of the supply needles 32A and the supply member body 31A. As a result, the supply member body 31A and the supply needles 32A are reliably fixed by the fixed portion 44A, thereby reliably fixing the filter 33A between the supply member body 31A and each supply needle 32A.

Figure 24:
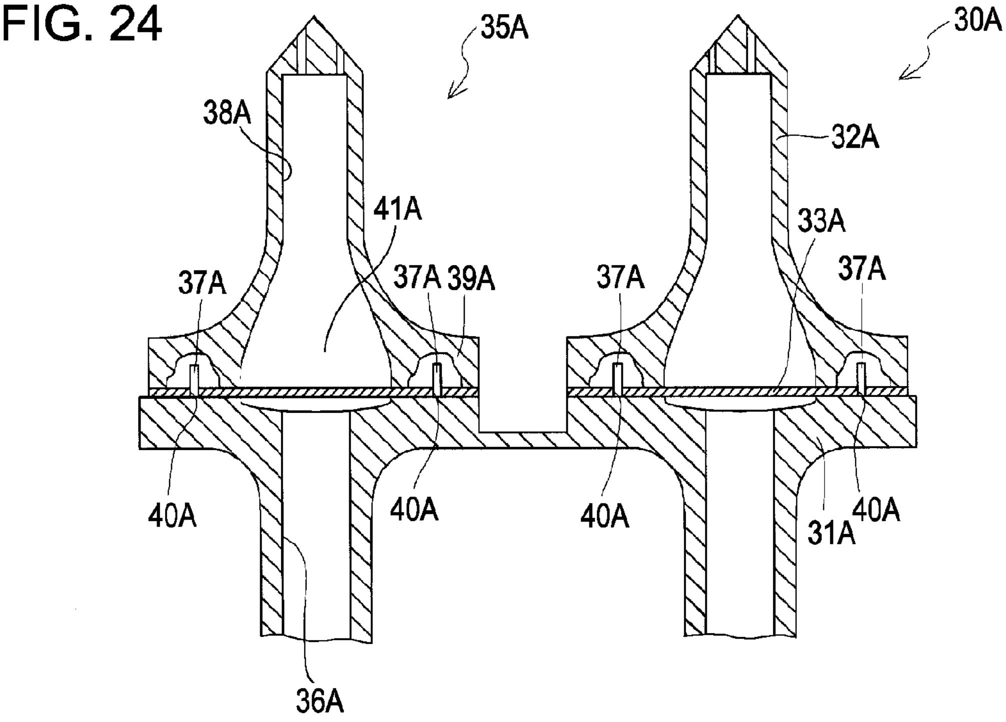
FIG. 24 is a sectional view showing the liquid ejecting head manufacturing method according to the fourth embodiment of the invention.
Figure 25:
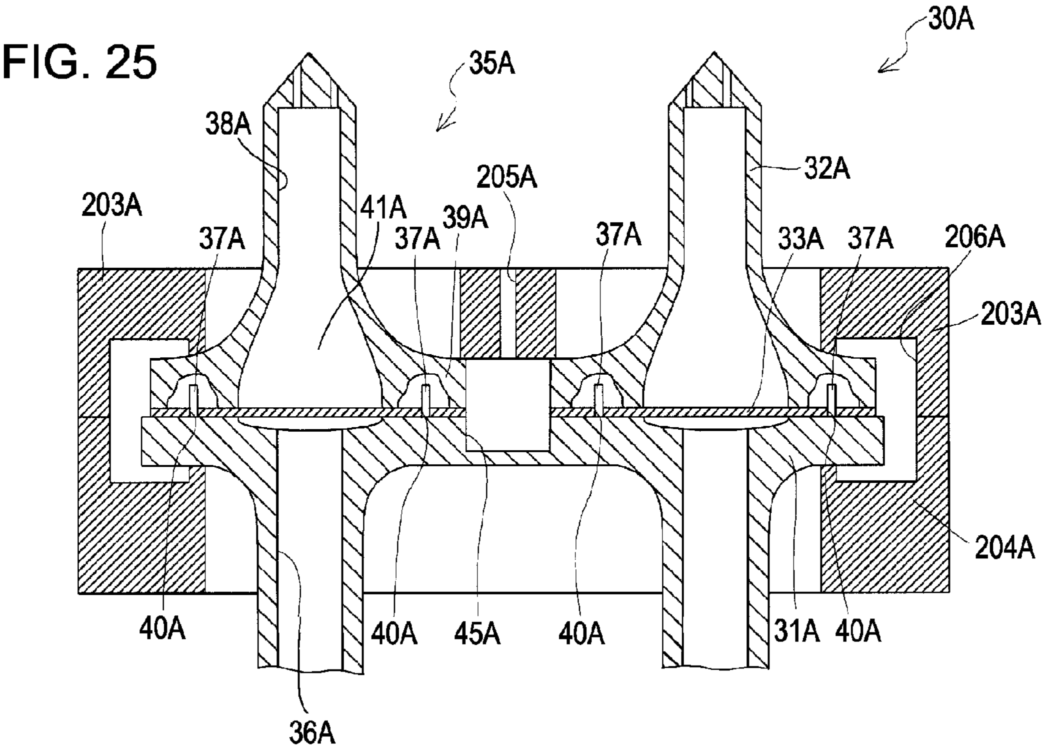
FIG. 25 is a sectional view showing the liquid ejecting head manufacturing method according to the fourth embodiment of the invention.
Figure 26:
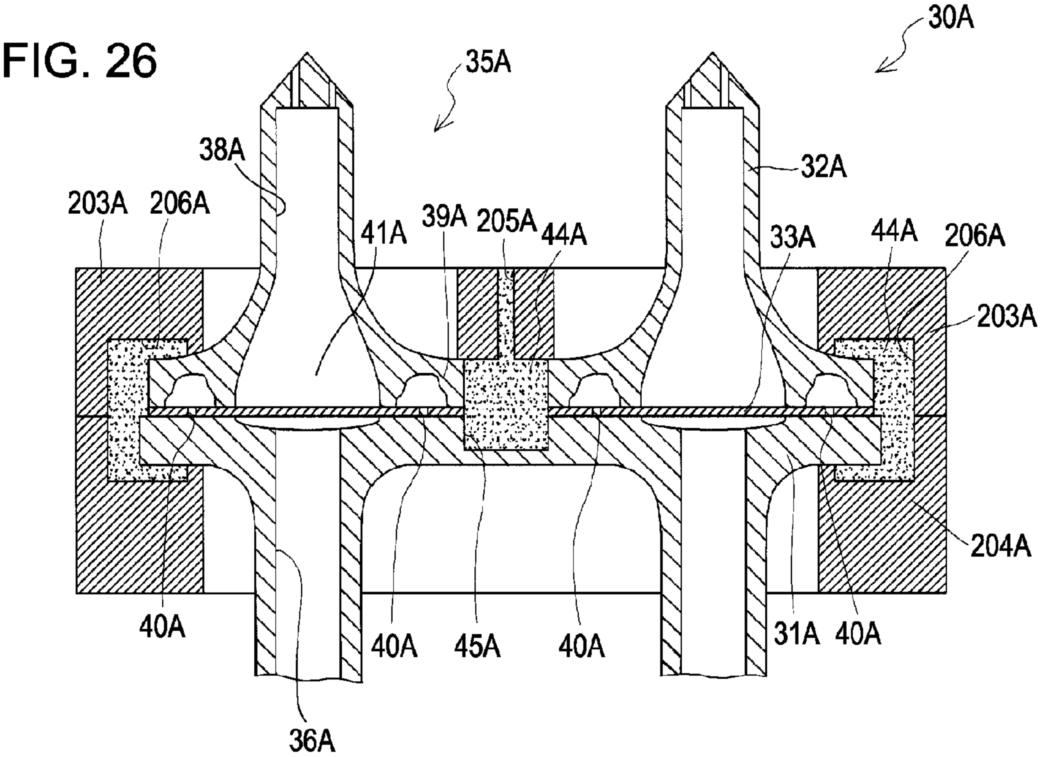
FIG. 26 is a sectional view showing the liquid ejecting head manufacturing method according to the fourth embodiment of the invention.

Here, the method of manufacturing the supply member including the fixed portion 44A will be described in detail with reference to FIGS. 24 to 26. In addition, FIGS. 24 to 26 are sectional views showing the method of manufacturing the supply member. However, in FIGS. 24 to 26, the same reference numerals will be given to the same constituents as those in FIGS. 19 to 21, and the repetitive description thereof will be omitted.

First, in the same manner as the third embodiment, the filter 33A is melt-fixed to the supply member body 31A in the state where the filter 33A is positioned to the supply member body 31A. Then, as shown in FIG. 24, the supply needle 32A is placed at a predetermined position on the filter 33A so that the filter 33A is interposed between the supply member body 31A and the supply needle 32A. In addition, here, the filter 33A may not necessarily be melt-fixed to the supply member body 31A, but the supply needle 32A may just be placed on the filter 33A after the positioning operation using the positioning hole 40A. In this case, the pin 37A may be formed in the supply needle 32A.

Next, as shown in FIG. 25, a mold 203A is set from the upside of one surface (the upside in the drawing) of the supply member body 31A, and a mold 204A is set from the downside of the other surface (the downside in the drawing) of the supply member body 31A. Accordingly, a cavity 206A is formed from the other surface (the downside in the drawing) of the supply member body 31A to the supply needle 32A formed on one surface of the supply member body 31A by the molds 203A and 204A. Meanwhile, the mold 203A is provided with a gate 205A as a resin material injection port which is formed at a position where the liquid supply paths 36A and 38A are interposed between the pins 37A and the positioning holes 40A. The position of the gate 205A is not particularly limited. However, in consideration of the fluidity of the injection resin, it is desirable that the gate 205A is formed at a position corresponding to the center portion of the supply member body 31A as in this embodiment. In addition, the gate 205A may be formed at plural positions.

In this state, as shown in FIG. 26, the fixed portion 44A is formed by integral molding. In detail, when the melted injection resin is filled into the cavity 206A of the mold 200A through the gate 205A of the mold 203A, the fixed portion 44A is molded.

In this case, since the pin 37A is formed so as to be melted by the heat of the injection resin, the pin 37A is melted away by the contact with the injection resin. Accordingly, the pin 37A does not disturb the flow of the resin.

According to this embodiment, since both the supply member body 31A and the supply needle 32A are fixed by the fixed portion 44A as the resin molded product, both the supply member body 31A and the supply needle 32A are reliably integrated with each other.

Further, in this embodiment, although the pin 37A is formed in the supply member body 31A, the pin 37A may be formed in the supply needle 32A and the filter 33A may be positioned and melt-fixed to the supply needle 32A. In addition, the pin 37A may be integrated with the supply member body 31A or the supply needle 32A. However, the pin 37A may be formed as a separate member having a melting point lower than those of the supply member body 31A and the supply needle 32A, and the pin 37A may be mounted to the supply member body 31A or the supply needle 32A. Since the melting point of the pin 37A is low, it is possible to easily melt the pin 37A without forming the pin 37A to be thin. Also, since the melting points of the supply member body 31A and the supply needle 32A are high, it is possible to prevent the supply member body 31A and the supply needle 32A from being deformed during the resin injection operation.

Other Embodiments

In the above-described first to fourth embodiments, the ink cartridges 13 as the liquid storing members are separably mounted to the supply members 30 and 30A, but the invention is not particularly limited thereto. For example, a liquid storing member such as an ink tank may be formed at a position different from the position of the printing head 11, and the liquid storing member and the printing head 11 may be connected to each other through a supply pipe such as a tube. That is, in the above-described embodiments, as the supply bodies, the needle-shaped supply needles 32 and 32A are exemplified, but the supply bodies are not limited to have the needle shape.

Further, in the above-described embodiments, the configuration is exemplified in which one head body 220 includes plural liquid supply paths 36 and 36A, but the head body may be provided for each color of the ink. In this case, each of the liquid supply paths 36 and 36A may communicate with each head body. That is, each of the liquid supply paths 36 and 36A may communicate with each of the nozzle rows having the parallel nozzle openings formed in each head body. Of course, the liquid supply paths 36 and 36A may not communicate with each nozzle row, but one of the liquid supply paths 36 and 36A may communicate with plural nozzle rows. Also, one row of nozzle rows may be divided into two parts, and each part may communicate with each of the liquid supply paths 36 and 36A. That is, the liquid supply paths 36 and 36A may communicate with a nozzle opening group including plural nozzle openings.

Furthermore, in the above-described embodiments, the invention is described by exemplifying the ink jet printing head 11 for ejecting the ink droplets, but the invention is widely applied to most of liquid ejecting heads. Examples of the liquid ejecting head include a printing head used for an image printing apparatus such as a printer, a color material ejecting head used for forming a color filter such as a liquid crystal display, an electrode material ejecting head used for forming an electrode of an organic EL display, an FED (Field Emission Display), and the like, and a bio-organic material ejecting head used for forming a bio chip.

What is claimed is:

1. A method of manufacturing a liquid ejecting head provided with a nozzle opening used to eject a liquid supplied from a liquid storing member storing the liquid therein through a liquid supply path, the method comprising:

positioning a filter to a first supply member or a second supply member by using positioning pins upon disposing the filter between first and second liquid supply paths, where the first supply member has the first liquid supply path which is a part of the liquid supply path and the second supply member has the second liquid supply path which is disposed on the side of one surface of the first supply member so as to communicate with the first liquid supply path and is the other part of the liquid supply path; and integrating at least the first supply member and the second supply member in such a manner that a fixed portion is molded by injecting a resin material from an injection portion of a mold disposed at a position where the first and second liquid supply paths are interposed between the positioning pins.

2. The method according to claim 1, wherein the positioning is performed by inserting the positioning pins into positioning holes of the filter, and wherein the integrating is performed in such a manner that the resin material is injected from the injection portion of the mold and the fixed portion is molded by melting the positioning pins using the injected resin material.

3. The method according to claim 2, wherein each positioning pin is formed by a member having a melting point lower than that of the first supply member and the second supply member, and is mounted to the first supply member or the second supply member.

4. The method according to claim 1, wherein the positioning pins are disposed in the first supply member or the second supply member.

5. The method according to claim 1, wherein in the positioning, the positioned filter is fixed to the first supply member.

6. The method according to claim 5, wherein the filter is melt-fixed to the first supply member.

7. The method according to claim 1, wherein the integrating is performed in such a manner that the fixed portion is molded by injecting the resin material to the one surface of the first supply member so as to cover a part of the second supply member.

8. The method according to claim 7, wherein in the integrating, the resin material is made to flow from the one surface of the first supply member into a concave portion which is formed in the first supply member and of which a part of opening is blocked by the second supply member.

9. The method according to claim 1, wherein in the integrating, the fixed portion is molded in the outer peripheries of the first supply member and the second supply member by the injected resin material so that the fixed portion has a portion from the first supply member to the second supply member.

* * * * *